(12) United States Patent
Kumar et al.

(10) Patent No.: US 11,087,063 B2
(45) Date of Patent: Aug. 10, 2021

(54) METHOD OF GENERATING LAYOUT DIAGRAM INCLUDING DUMMY PATTERN CONVERSION AND SYSTEM OF GENERATING SAME

(71) Applicant: TAIWAN SEMICONDUCTOR MANUFACTURING COMPANY, LTD., Hsinchu (TW)

(72) Inventors: Ritesh Kumar, Hsinchu (TW); Chung-Hsing Wang, Baoshan Township (TW); Kuo-Nan Yang, Hsinchu (TW); Hiranmay Biswas, Kolkata (IN); Shu-Yi Ying, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 160 days.

(21) Appl. No.: 16/405,883

(22) Filed: May 7, 2019

(65) Prior Publication Data
US 2020/0004915 A1 Jan. 2, 2020

Related U.S. Application Data

(60) Provisional application No. 62/691,915, filed on Jun. 29, 2018.

(51) Int. Cl.
*G06F 30/394* (2020.01)
*G06F 30/398* (2020.01)

(52) U.S. Cl.
CPC .......... *G06F 30/394* (2020.01); *G06F 30/398* (2020.01)

(58) Field of Classification Search
CPC ............................. G06F 30/394; G06F 30/398
USPC ........................................................ 716/126
See application file for complete search history.

(56) References Cited

U.S. PATENT DOCUMENTS

| | | | |
|---|---|---|---|
| 7,260,442 B2 | 8/2007 | Hwang et al. | |
| 7,454,720 B2 * | 11/2008 | Krueger | G11C 5/14 716/132 |
| 7,802,224 B2 * | 9/2010 | Mori | H01L 23/528 716/55 |
| 9,256,709 B2 | 2/2016 | Yu et al. | |
| 2001/0011362 A1 * | 8/2001 | Yoshinaga | G06F 30/39 716/122 |

(Continued)

*Primary Examiner* — Suchin Parihar
(74) *Attorney, Agent, or Firm* — Hauptman Ham, LLP

(57) ABSTRACT

A method (of revising an initial layout diagram of a wire routing arrangement) includes: identifying, in a first conductance layer of the initial layout diagram, a routed pattern and a dummy pattern, each of which extends in a first direction; the routed patterns being functional in a representation of a circuit; the dummy patterns being non-functional in the representation of the circuit; and revising to form a revised layout diagram, the revising including adding first and second jumper patterns, into a second conductance layer, which extend in a second direction substantially perpendicular to the first direction, and adding via patterns, into an interconnection layer between the first and second conductance layers, which represent (A) connections between the first jumper pattern and first ends of the corresponding routed and dummy patterns, and (B) connections between the second jumper pattern and second ends of the corresponding routed and dummy patterns.

20 Claims, 16 Drawing Sheets

(56) References Cited

U.S. PATENT DOCUMENTS

2014/0040838 A1 2/2014 Liu et al.
2015/0278429 A1 10/2015 Chang

* cited by examiner

US 11,087,063 B2

METHOD OF GENERATING LAYOUT DIAGRAM INCLUDING DUMMY PATTERN CONVERSION AND SYSTEM OF GENERATING SAME

PRIORITY CLAIM

The present application claims the priority of U.S. Provisional Application No. 62/691,915, filed Jun. 29, 2018, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process/technology node by which will be fabricated a semiconductor device based on a layout diagram. The design rule set compensates for variability of the corresponding process/technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
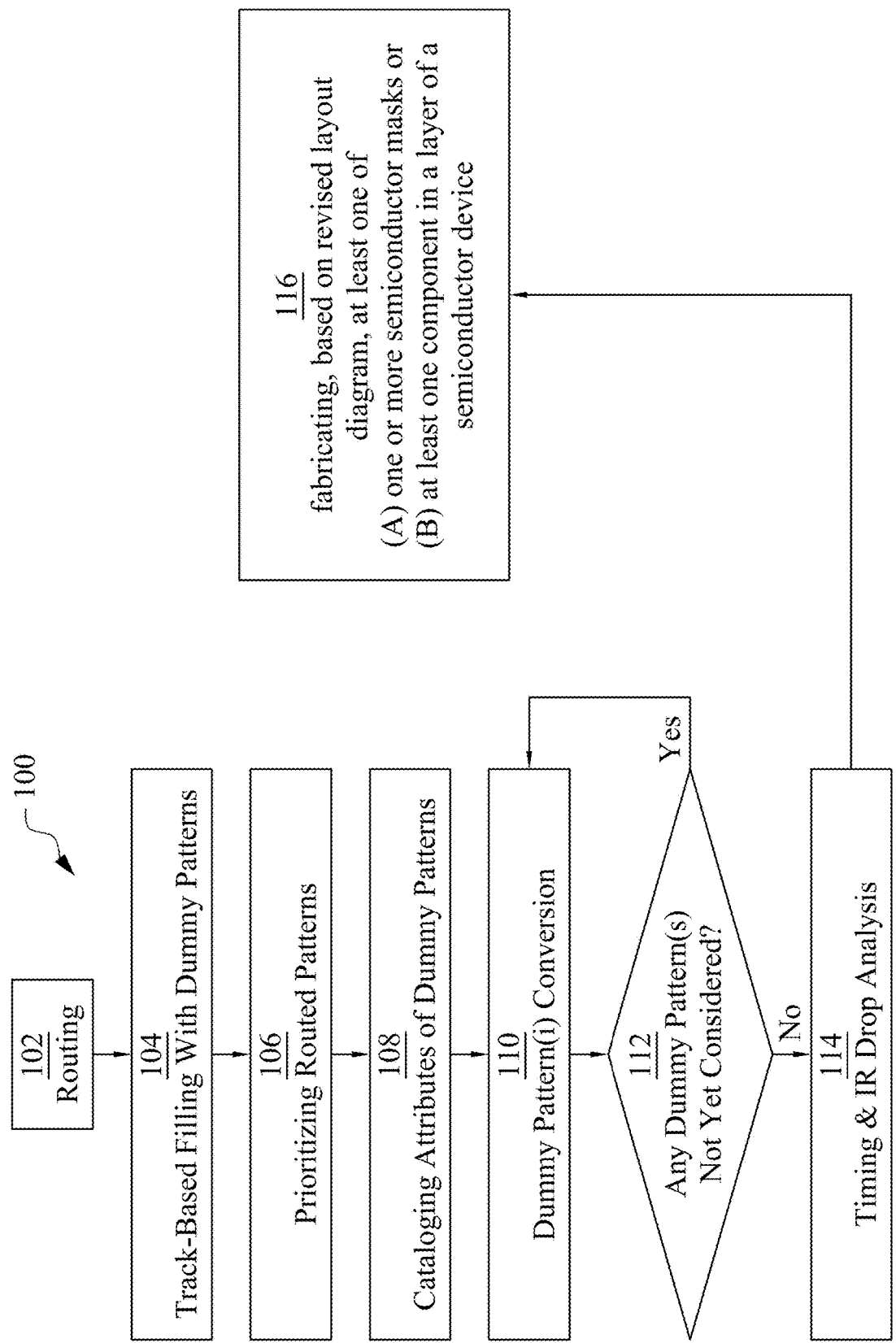
FIG. 1A is a flowchart of a method of generating and revising an initial layout diagram, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, post-dummy-fill revisions are made to a layout diagram in order to reduce the resistance of one or more routed patterns, which reduces a signal propagation delay associated with the routed pattern(s). In some embodiments, for a portion of a layout diagram representing an $i^{th}$ conductance layer, e.g., an $i^{th}$ layer of metallization (layer M(i)), which has already undergone a dummy fill process, electrical resistance through a routed pattern is reduced by converting one or more adjacent dummy patterns into an electrically parallel configuration with the routed pattern. In some embodiments, for a portion of a layout diagram representing an $i^{th}$ layer of metallization (layer M(i)) which has already undergone a dummy fill process, electrical resistance through two or more routed patterns which already are in an electrically parallel configuration is further reduced by converting one or more adjacent dummy patterns into the electrically parallel configuration with the two or more routed patterns. By reducing the electrical resistance, a signal propagation delay associated with the routed pattern(s) is correspondingly reduced.

FIG. 1A is a flowchart of a method 100 of generating an initial layout diagram of a wire routing arrangement and then revising the same, in accordance with one or more embodiments.

Examples of a portion of an initial layout diagram which can be revised according to method 100 include portion 200A of FIG. 2A (discussed below), portion 300 of FIG. 3 (discussed below), or the like. In some embodiments, the initial layout diagram and versions thereof are stored on a non-transitory computer-readable medium, e.g., computer-readable medium 704 in FIG. 7 (discussed below). Method 500 is implementable, for example, using EDA system 700 (FIG. 7, discussed below), in accordance with some embodiments.

In FIG. 1A, method 100 includes blocks 102-116. At block 102, patterns in a conductive layer are routed to form a precursor version of an initial layout diagram which includes 'routed patterns.' Each routed pattern is a functional conductor pattern (discussed below) which represents a conductor. Not all locations in the conductive layer are filled with routed patterns such that empty locations remain in conductive layer of the initial precursor version of the layout diagram. From block 102, flow proceeds to block 104. At block 104, a track-based 'dummy fill' process (discussed below) is performed on the precursor version of the layout diagram, in which dummy patterns are put in at least some, if not most (if not all), empty locations in the conductive layer, resulting in the initial layout diagram. Each dummy pattern is a non-functional conductor pattern (discussed below). From block 104, flow proceeds to block 106.

At block 106, the routed patterns are prioritized (discussed below). From block 106, flow proceeds to block 108. At block 108, attributes of the dummy patterns are catalogued. In some embodiments, the catalog of attributes of the dummy patterns are used for prioritizing amongst dummy patterns (discussed below). From block 108, flow proceeds to block 110.

At block 110, an $i^{th}$ dummy pattern (where i is a non-negative integer) is converted into an electrically parallel configuration with a corresponding routed pattern (discussed below). As a result of block 110, the layout diagram is revised. From block 110, flow proceeds to block 112. At block 112, it is determined if any dummy patterns have not yet been considered for conversion. If the outcome of decision block 112 is yes (meaning that one or more dummy patterns remain which have yet to be considered for conversion), then flow proceeds to loop back to block 110. If the outcome of decision block 112 is no (meaning that no dummy patterns remain which have yet to be considered for conversion), then flow proceeds to block 114. At block 114, a timing and ohmic loss (IR drop) analysis is performed. Assuming that the results of block 114 are acceptable, the flow proceeds to block 116.

At block 116, based on the revised layout diagram, at least one of (A) one or more semiconductor masks or (B) at least one component in a layer of a semiconductor device is fabricated. See discussion below of FIG. 8. In some embodiments, the fabricating further includes performing one or more lithographic exposures based on the revised layout diagram.

Figure 1B:
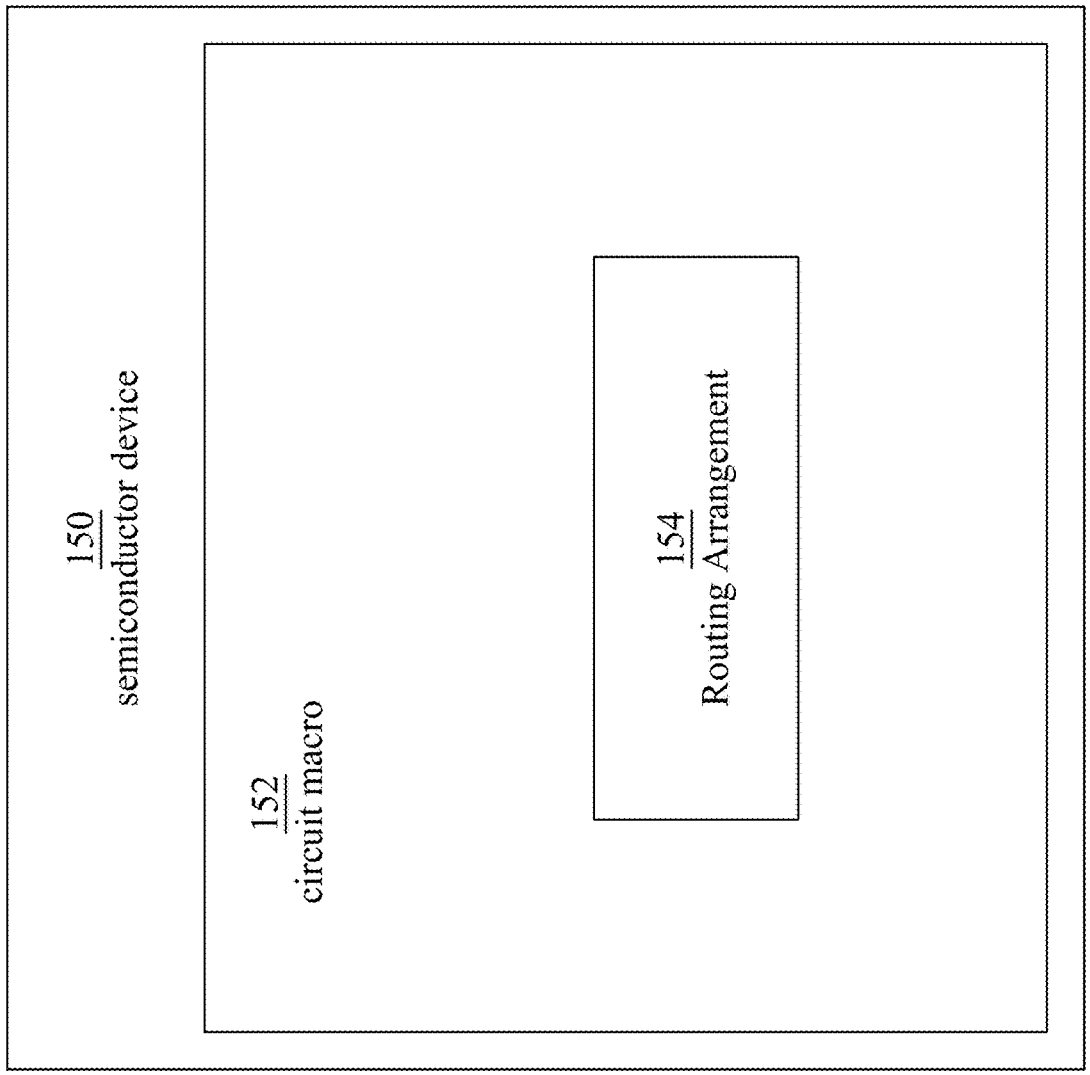
FIG. 1B is a block diagram of a semiconductor device 100, in accordance with one or more embodiments.

FIG. 1B is a block diagram of a semiconductor device 150, in accordance with one or more embodiments.

In FIG. 1B, semiconductor device 150 includes, among other things, a circuit macro (hereinafter, macro) 152. In some embodiments, macro 152 is an SRAM macro. In some embodiments, macro 152 is a macro other than an SRAM macro. Macro 152 includes, among other things, a wire routing arrangement 154. Examples of layout diagrams resulting in wire routing arrangement 154 include the routing arrangement layout diagrams in each of each of FIGS. 2C, 3 and 4C.

Figure 2A:
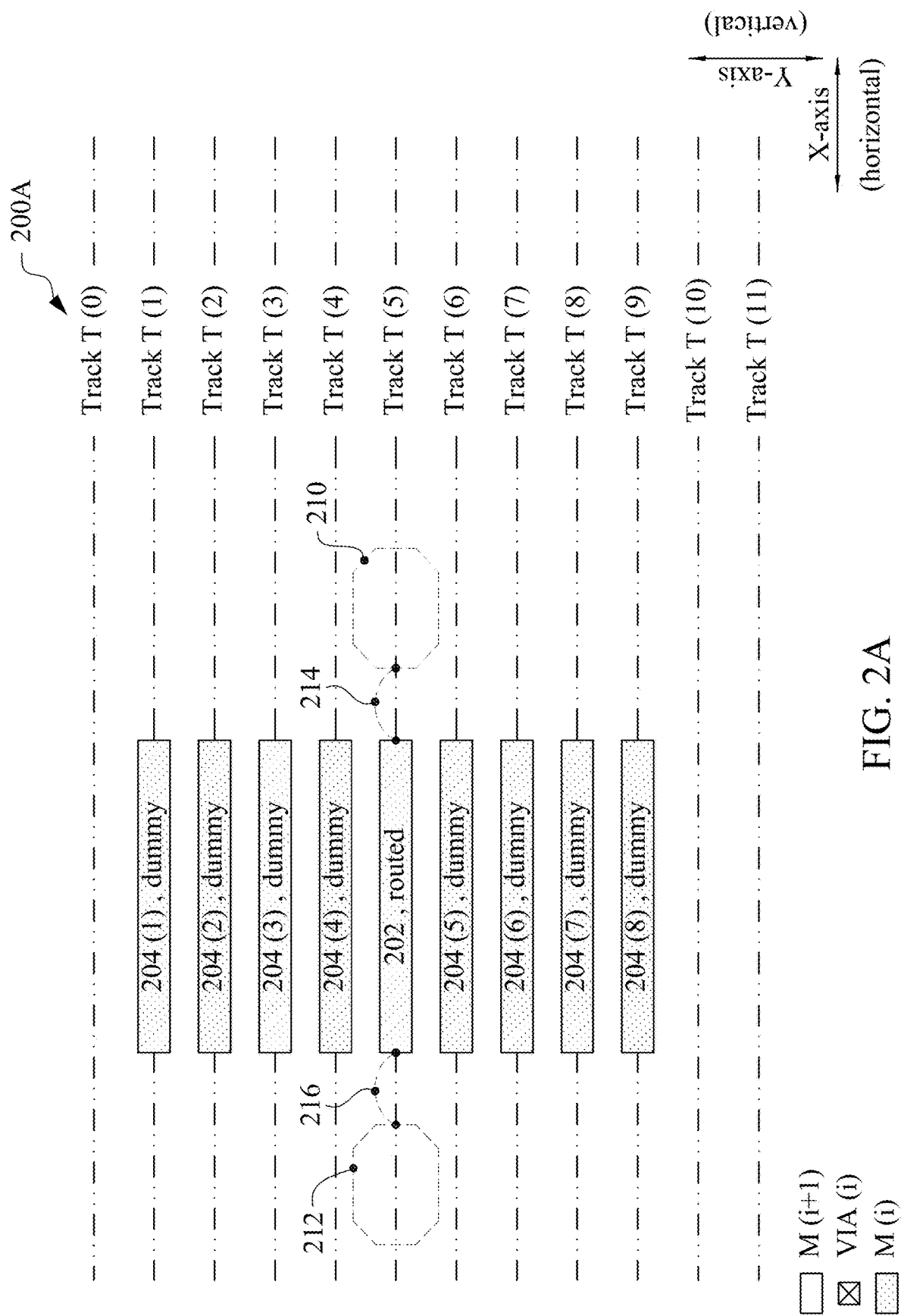
FIG. 2A is an example of a portion of an initial layout diagram, in accordance with one or more embodiments.
Figure 2B:
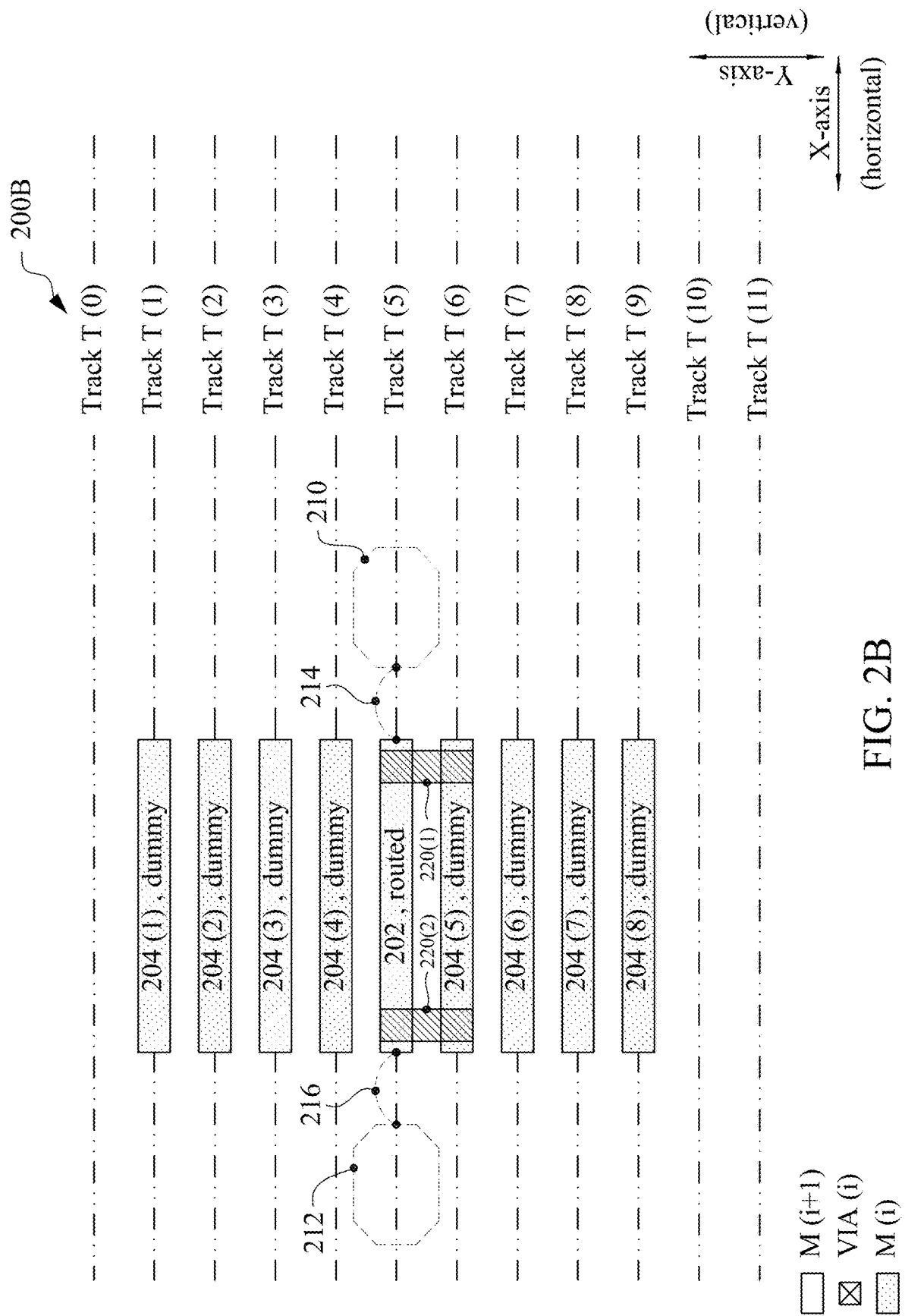
FIGS. 2B-2C are corresponding portions of a layout diagram of post-dummy-fill revisions made to the layout diagram of FIG. 2A, in accordance with one or more embodiments.
Figure 2C:
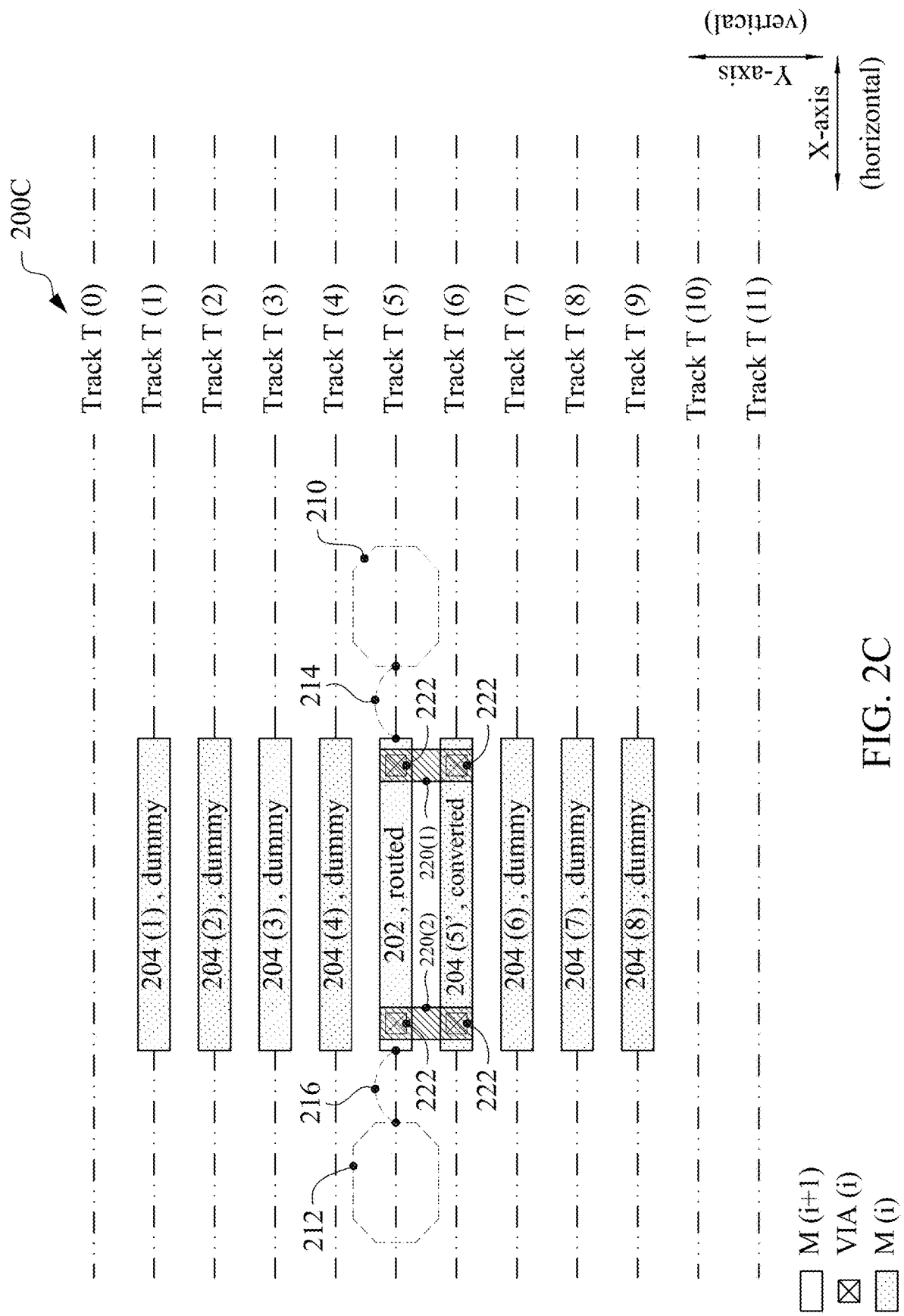

FIGS. 2A-2C, taken together, provide an example of how a dummy pattern is converted into an electrically parallel configuration with a routed pattern, in accordance with one or more embodiments. The electrically parallel configuration of the routed pattern and the converted pattern exhibits a lower resistance than the routed pattern taken alone. As a beneficial consequence, a signal propagation delay associated with the electrically parallel configuration of the routed pattern and the converted pattern is smaller than the signal propagation delay associated with the routed pattern taken alone.

More particularly, FIG. 2A is an example of a portion 200A of an initial layout diagram of a wire routing arrangement, which will be subjected to a method of revising a layout diagram, in accordance with one or more embodiments.

Portion 200A of the layout diagram includes an $i^{th}$ conductance layer, e.g., a layer M(i) of metallization, where i is an integer and i≥1. In some embodiments, the $i^{th}$ layer is the fourth layer, $M\_4^{th}$, of metallization. If the numbering convention of the corresponding design rules of the corresponding semiconductor process technology node begins with first layer $M\_1^{st}$ being referred to as M(0), then fourth layer $M\_4^{th}$ is also referred to as M(3). Alternatively, if the numbering convention begins with first layer $M\_1^{st}$ being referred to as M(1), then fourth layer $M\_4^{th}$ is also referred to as M(4). In some embodiments, second and third layers, $M\_2^{nd}$ and $M\_3^{rd}$, of metallization are located between layer $M\_1^{st}$ and layer $M\_4^{th}$. In some embodiments, a fifth layer, $M\_5^{th}$, of metallization is located, relative to layer $M\_1^{st}$, on the opposite side of $M\_4^{th}$.

Layer M(i) includes patterns 202 and 204(1)-204(8) representing corresponding conductive segments of a layer of metallization in a semiconductor device which is manufactured at least in part based on the layout diagram which includes portion 200A. Pattern 202 is a routed pattern (discussed below). Patterns 204(1)-204(8) are dummy patterns (discussed below).

In FIG. 2A, layer M(i) is arranged, at least in part, with respect to an imaginary grid which includes tracks T(0)-T(11) that extend in a first direction. In some embodiments, the first direction is the X-axis and is described as being horizontal. In some embodiments, tracks T(0)-T(11) are spaced apart in a second direction. In some embodiments, the second direction is the Y-axis and is described as being vertical. In some embodiments, tracks T(0)-T(11) are spaced apart in vertically by at least an amount sufficient to ensure that each of routed pattern 202 and dummy patterns 204(1)-204(4) is separated vertically from its immediate neighbor(s) by a minimum separation distance required by a corresponding design rule of the corresponding semiconductor process technology node.

In some embodiments, a routed pattern, e.g., routed pattern 202, is a functional conductor pattern which is considered functional in a sense that a corresponding conductor in a semiconductor device resulting from a layout diagram including the routed pattern is not left electrically floating but instead is included in a signal path, e.g., a control signal path, a data signal path, a power path, or the like. In some embodiments, a dummy pattern, e.g., dummy patterns 202(1)-202(8), is non-functional in a sense that a corresponding conductor in a semiconductor device resulting from a layout diagram including the dummy pattern is left electrically floating rather than being included in a signal path, e.g., a control signal path, a data signal path, a power path, or the like. In some embodiments, a routed pattern, e.g., routed pattern 202, is a functional conductor pattern which is considered functional in a sense that a corresponding conductor in a semiconductor device resulting from a layout diagram including the routed pattern represents a part of a power grid (PG) of the semiconductor device.

In some embodiments, portion 200A layout diagram further includes a group of patterns 210 and a group of patterns 212, each of which is shown with a phantom line (dashed line) having an octagonal shape. Each of groups 210 and 212 represents a circuit and henceforth will be referred to as a circuit. For simplicity of illustration, the patterns included in each of circuits 210 and 212 are not shown. In some embodiments, one or more of circuits 210 and 212 is a logical gate, e.g., a buffer, an inverter, a NAND, a NOR, or the like. In some embodiments, one or more of circuits 210 and 212 is a circuit other than a logical gate. In some embodiments, each of circuits 210 and 212 provides the same function. In some embodiments, circuits 210 and 212 provide correspondingly different functions. In some embodiments, one or more corresponding input/output patterns (also known as pin patterns) of circuits 210 and/or 212 are located in layer M(i), while other patterns of circuits 210 and/or 212 are located in layers other than layer M(i).

Circuits 210 and 212 are included in portion 200A of the layout diagram to promote recollection that routed pattern 202 is functional. Accordingly, layout diagram 200A further includes: a connector 214 which represents an electrical connection between a first end of routed pattern 202 and one or more patterns (not shown) in circuit 210; and a connector 216 which represents an electrical connection between a second end of routed pattern 202 and one or more patterns (not shown) in circuit 212.

In some embodiments, the generation of layout diagram 200A includes: placing (also known as routing) routed pattern 202 in layer M(i) as shown in FIG. 2A, as well as any other routed patterns (not shown) before any dummy patterns are placed, resulting in a precursor version (not shown) of portion 200A; and then performing a 'dummy fill' process on the precursor of portion 200A. The precursor of portion 200A exhibits a relatively higher number of empty locations along tracks T(0)-T(9) and a correspondingly lower density of patterns, the latter representing corresponding conductive segments of a corresponding layer of metallization in a semiconductor device. In some embodiments, the dummy fill process includes analyzing a density of routed patterns in the precursor version of portion 200A, and then adding dummy patterns, e.g., dummy patterns 204(1)-204(8), so that a combined density of routed pattern 202 and dummy patterns 204(1)-204(8) satisfies a minimum density of a corresponding design rule of the corresponding semiconductor process technology node. In some embodiments, the minimum density is selected to make pattern density more uniform and thereby improve a chemical mechanical planarization (CMP) process of the corresponding semiconductor process technology node. In some embodiments, the dummy fill is track-based.

In some embodiments, in order to reduce the resistance of routed pattern 202, one or more adjacent ones of dummy patterns 204(1)-204(9) are converted into an electrically parallel configuration with routed pattern 202, which is discussed below in the context of FIGS. 2A-2C and 3.

More particularly, FIGS. 2B-2C are corresponding portions 200B-200C of a layout diagram showing post-dummy-fill revisions made to portion 200A (FIG. 2A) of the layout diagram, in accordance with one or more embodiments.

The post-dummy-fill revisions of FIGS. 2B-2C are made to reduce the resistance of routed pattern 202, and thereby reduce a signal propagation delay associated with routed pattern 202. More particularly, the post-dummy-fill revisions of FIGS. 2B-2C are made to reduce the resistance of routed pattern 202 by converting dummy pattern 204(5) into an electrically parallel configuration with routed pattern 202.

Portion 200B of FIG. 2B is similar to portion 200A of FIG. 2A. For purposes of brevity, the discussion will focus on differences between portion 200B and portion 200A. In addition to layer M(i), portion 200B includes a layer M(i+1) of metallization above layer M(i). Continuing the example of portion 200A of FIG. 2A, in which layer M(i) is layer M(4), then layer M(i+1) is layer M(5). In some embodiments, in addition to layer M(i), portion 200B includes a layer M(i−1) of metallization below layer M(i). Continuing the example of portion 200A of FIG. 2A, in which in which layer M(i) is layer M(4), then layer M(i−1) is layer M(3).

In FIG. 2B, jumper patterns 220(1) and 220(2) are included in layer M(i+1) and are disposed to overlap corresponding first and second ends correspondingly of routed pattern 202 and dummy pattern 204(5). Jumper patterns 220(1)-220(2) represent corresponding conductive segments of a layer of metallization in a semiconductor device which is manufactured at least in part based on the layout diagram which includes portion 200B. In FIG. 2B, layer M(i+1) is arranged, at least in part, with respect to an imaginary grid which includes tracks (not shown) that extend in the second direction, e.g., the Y-axis, which is described as being vertical.

Portion 200C of FIG. 2C is similar to portion 200B of FIG. 2B. For purposes of brevity, the discussion will focus on differences between portion 200C and portion 200B. In addition to layers M(i) and M(i+1), portion 200C includes an interconnection layer VIA(i) between layers M(i) and M(i+1). Continuing the example of portion 200A of FIG. 2A, in which in which layer M(i) is layer M(4), then layer VIA(i) is layer VIA(4).

In FIG. 2C, via patterns 222 are included in layer VIA(i) and are disposed at locations where jumper patterns 220(1)-220(2) overlap corresponding first and second ends correspondingly of routed pattern 202 and dummy pattern 204(5). Via patterns 222 represent corresponding vias of a corresponding interconnection layer in a semiconductor device which is manufactured at least in part based on the layout diagram which includes portion 200C.

The combination of jumper patterns 220(1)-220(2) and the corresponding via patterns 222 in portion 200C of FIG. 2C arranges dummy pattern 204(5) of FIGS. 2A-2B into electrically parallel configuration with routed pattern 202. Accordingly, dummy pattern 204(5) of FIGS. 2A-2B is shown in FIG. 2C as converted pattern 204(5)'.

The electrically parallel configuration of routed pattern 202 and converted pattern 204(5)' exhibits a lower resistance than routed pattern 202 taken alone. As a beneficial consequence, a signal propagation delay associated with the electrically parallel configuration of routed pattern 202 and converted pattern 204(5)' is smaller than the signal propagation delay associated with routed pattern 202 taken alone.

For simplicity of description, FIGS. 2A-2C assume that dummy pattern 204(5) is available for conversion into the electrically parallel configuration with routed pattern 202. More particularly, the assumption that dummy pattern 204(5) is available includes: an assumption that dummy pattern 204(5) is a dummy pattern and not another routed pattern; an assumption that there is unoccupied space in layer M(i+1) in which to locate jumper patterns 220(1)-220(2) so as to overlap corresponding first and second ends correspondingly of routed pattern 202 and dummy pattern 204(5); an assumption that there is unoccupied space in layer VIA(i) in which to locate via patterns 222 at locations in between where first and second ends correspondingly of each of routed pattern 202 and dummy pattern 204(5) are overlapped by corresponding jumper patterns 220(1)-220(2); or the like. All converted patterns were once dummy patterns. Not all dummy patterns can become converted patterns, i.e., not all dummy patterns are convertible. The determination of availability for conversion of a dummy pattern is discussed in more detail below in the context, e.g., the flowcharts of FIGS. 5A-5D.

In some embodiments, relative to a given routed pattern in a given layer of metallization, conversion of available dummy patterns is iterative and continues until one or more stopping criteria are satisfied. In some embodiments, each dummy pattern is iteratively considered for conversion with the stopping criterion being that no dummy pattern remains unconsidered for conversion, i.e., which has not yet been considered for conversion.

Figure 3:
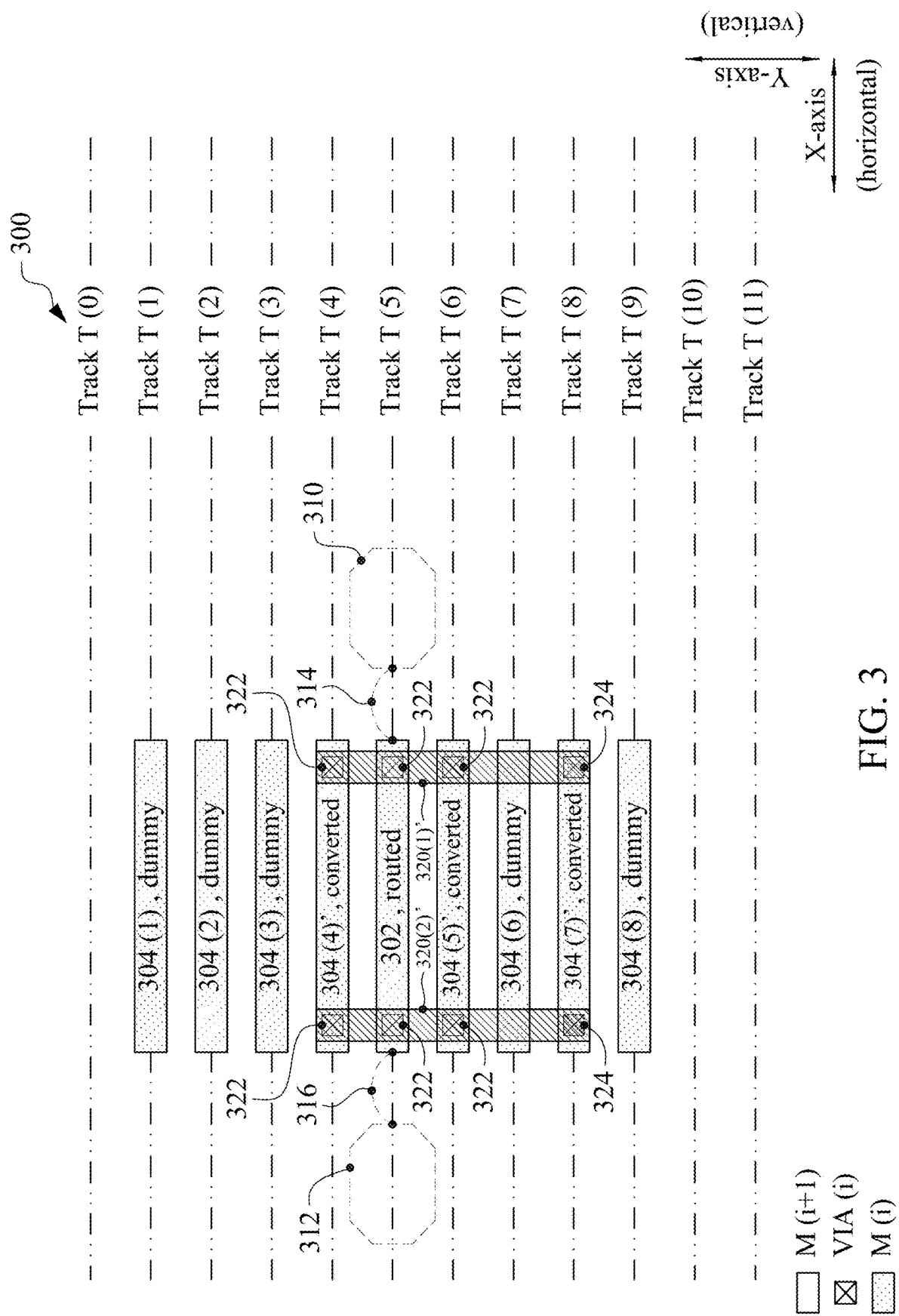
FIG. 3 is a portion of a layout diagram of post-dummy-fill revisions made to the layout diagram of FIG. 2C, in accordance with one or more embodiments.

FIG. 3 provides an example of how one or more dummy patterns are converted into an electrically parallel configuration with a routed pattern, in accordance with one or more embodiments.

More particularly, FIG. 3 is a portion 300 of a layout diagram showing post-dummy-fill revisions made to portion 200C (FIG. 2C) of the layout diagram, in accordance with one or more embodiments.

The post-dummy-fill revisions of FIG. 3 are made to reduce the resistance of routed pattern 302, and thereby reduce a signal propagation delay associated with routed pattern 302. More particularly, the post-dummy-fill revisions of FIG. 3 are made to reduce the resistance of routed pattern 302 by converting dummy patterns 304(4) and 304(7) as well as dummy pattern 304(5), into an electrically parallel configuration with routed pattern 302.

Portion 300 of FIG. 3 is similar to portion 200C of FIG. 2C. For purposes of brevity, the discussion will focus on differences between portion 300 and portion 200C. In FIG. 3, jumper patterns, which otherwise correspond to jumper patterns 220(1) and 220(2) of FIG. 2C, have been extended to overlap corresponding first and second ends correspondingly of dummy patterns 304(4) and 304(7), as well as routed pattern 302 and dummy pattern 304(5), and accordingly are referred to as jumper patterns 320(1)' and 320(2)'.

In FIG. 3, in addition to via patterns 322, via patterns 324 have been included in layer VIA(i), the latter being disposed at locations where jumper patterns 320(1)'-320(2)' overlap corresponding first and second ends correspondingly of dummy patterns 304(4) and 304(7), as well as first and second ends correspondingly of routed pattern 302 and dummy pattern 304(5).

The combination of jumper patterns 320(1)'-320(2)' and the corresponding via patterns 322 and 324 in portion 300 of FIG. 3 arranges dummy patterns 304(4) and 304(7) of FIG. 3C into electrically parallel configuration with routed pattern 302 and converted pattern 304(5)'. Accordingly, dummy patterns 304(4) and 304(7) of FIG. 3 are shown in FIG. 3 as converted patterns 304(4)' and 304(7)'.

The electrically parallel configuration of routed pattern 302 and converted patterns 304(4)', 304(5)' and 304(7)' exhibits a lower resistance than the pair of routed pattern 302 and converted pattern 304(5)'. As a beneficial consequence, a signal propagation delay associated with the electrically parallel configuration of routed pattern 302 and converted patterns 304(4)', 304(5)' and 304(7)' is smaller than the signal propagation delay associated with the pair of routed pattern 302 and converted pattern 304(5)'.

For simplicity of description, FIG. 3 assumes that dummy patterns 304(4) and 304(7) are available for conversion into the electrically parallel configuration with routed pattern 302, and that dummy pattern 304(6) is not available for conversion into the electrically parallel configuration with routed pattern 302. Accordingly, for example, no via patterns 322 are shown where ends of dummy pattern 304(6) are overlapped by corresponding jumper patterns 320(1)' and 320(2)'. Again, the determination of availability for conversion of a dummy pattern is discussed in more detail below in the context, e.g., the flowcharts of FIGS. 5A-5D.

In some embodiments, the conversion process applies to single routed patterns. In some embodiments, the conversion process applies to single routed patterns and patterns which already are in an electrically parallel configuration.

Figure 4A:
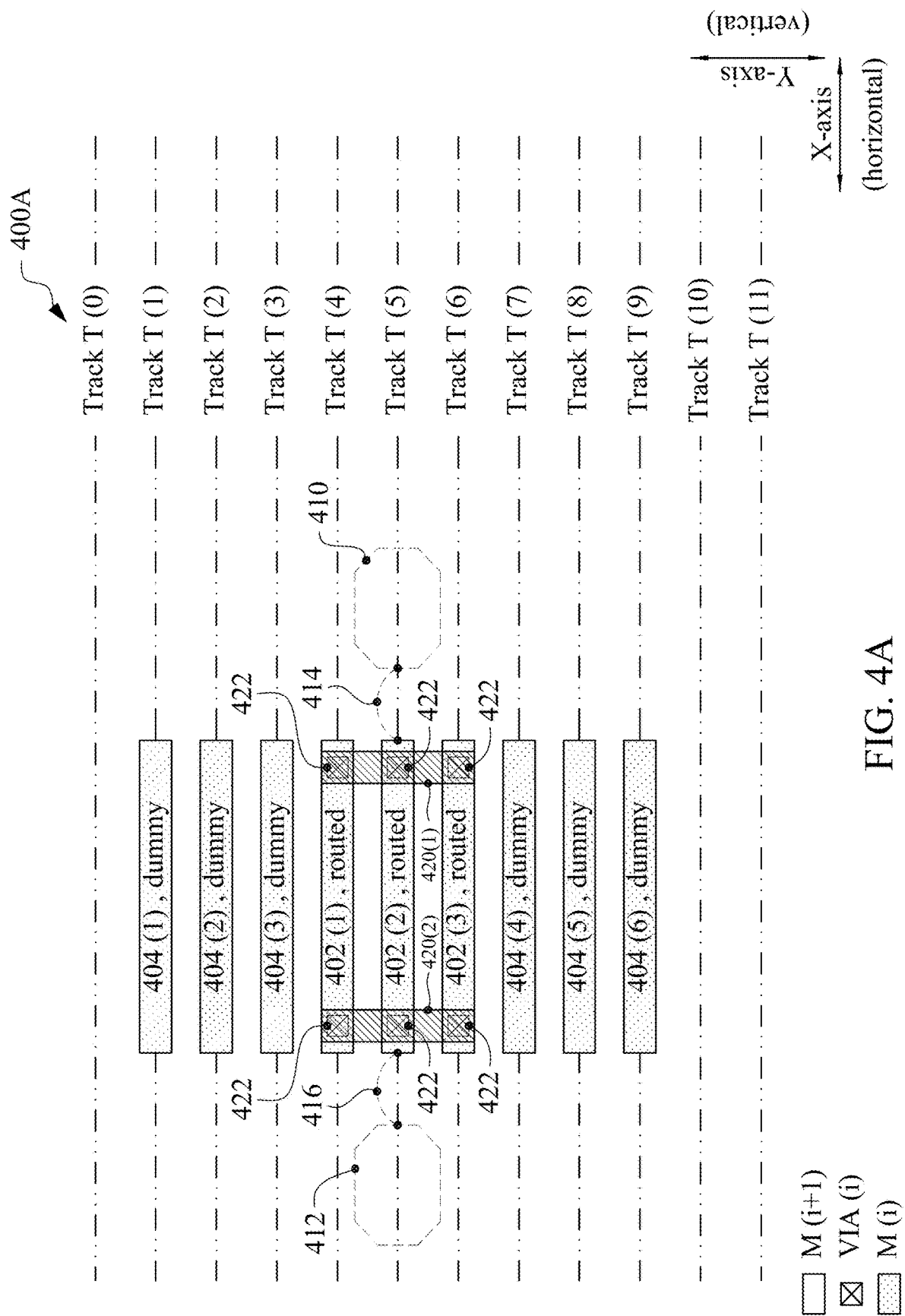
FIG. 4A is an example of a portion of an initial layout diagram arrangement, in accordance with one or more embodiments.
Figure 4B:
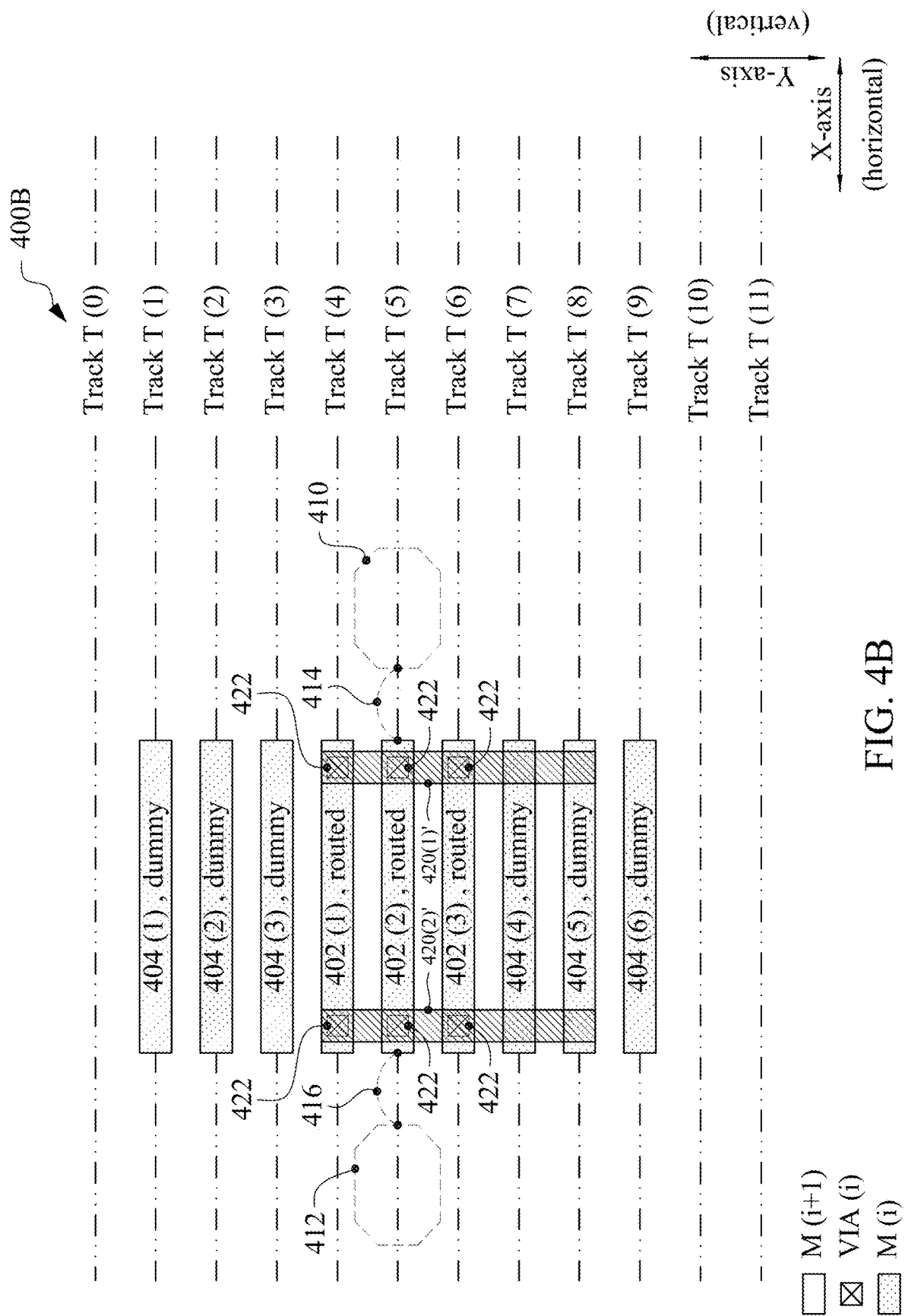
FIGS. 4B-4C are corresponding portions of a layout diagram of post-dummy-fill revisions made to the layout diagram of FIG. 4A, in accordance with one or more embodiments.
Figure 4C:
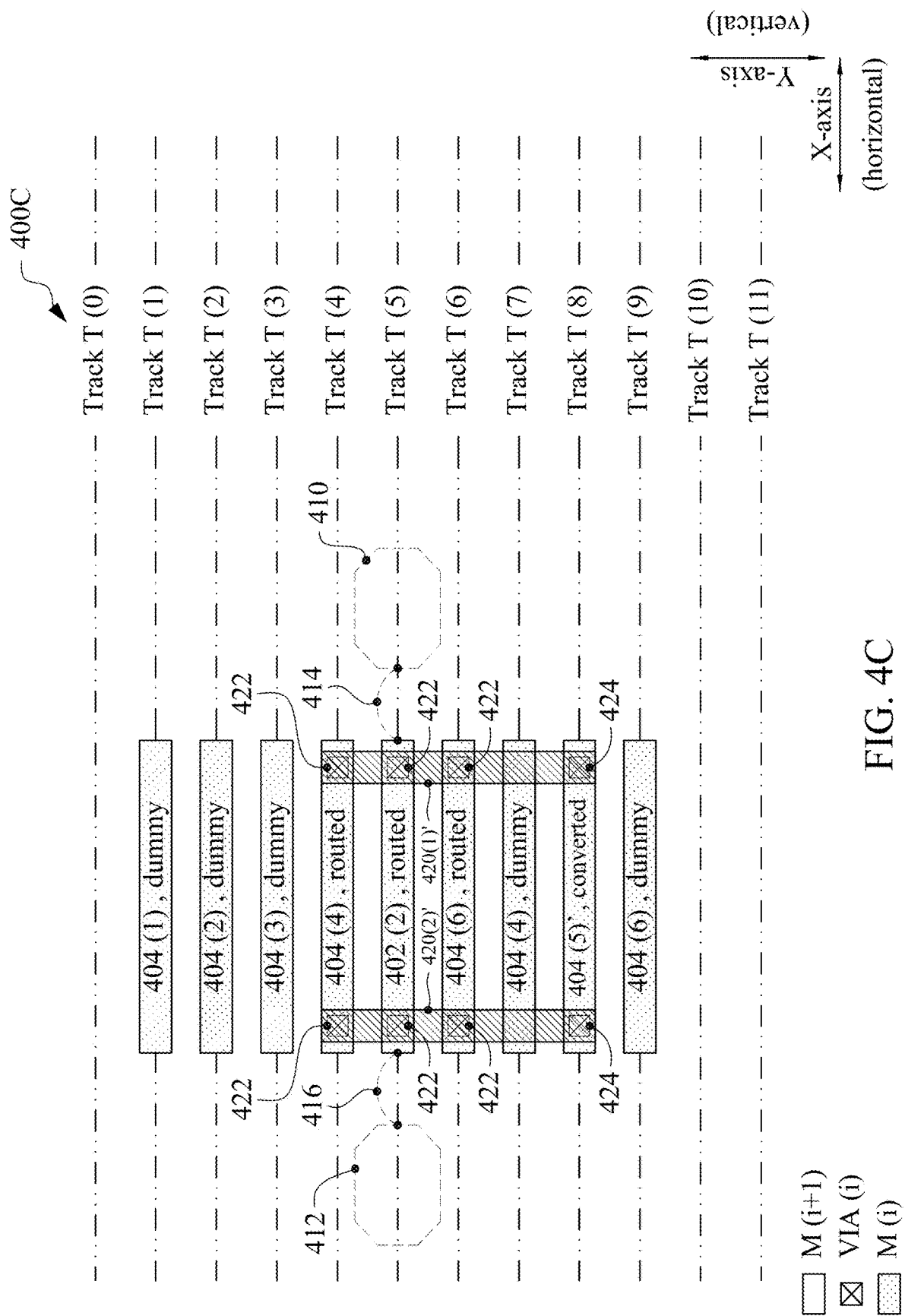

FIGS. 4A-4C, taken together, provide an example of a dummy pattern is converted into an electrically parallel configuration with an existing electrically parallel configuration of routing patterns, in accordance with one or more embodiments. The electrically parallel configuration of the dummy pattern with the existing electrically parallel configuration of routed patterns exhibits a lower resistance than the existing electrically parallel configuration of the routed patterns taken alone. As a beneficial consequence, a signal propagation delay associated with the electrically parallel configuration of the dummy pattern with the existing electrically parallel configuration of the routed patterns is smaller than the signal propagation delay associated with the existing electrically parallel configuration of the routed patterns taken alone.

More particularly, FIG. 4A is an example of a portion 400A of an initial layout diagram of a wire routing arrangement, which will be subjected to a method of revising a layout diagram, in accordance with one or more embodiments.

Portion 400A of FIG. 4A is similar to portion 200A of FIG. 2A. For purposes of brevity, the discussion will focus on more on differences between portion 400A and portion 200A than on similarities. Routed pattern 402(2) of portion 400A of FIG. 4A corresponds to routed pattern 202 of portion 200A of FIG. 2A. Routed patterns 402(1) and 402(3) in portion 400A of FIG. 4A have replaced corresponding dummy patterns 204(4) and 204(5). As a result, dummy patterns 404(4)-404(6) in portion 400A of FIG. 4A correspond to dummy portions 204(6)-204(8) in portion 200A of FIG. 2A.

Portion 400A of FIG. 4A also is similar to portion 200C of FIG. 2C. For purposes of brevity, the discussion will focus on more on differences between portion 400A and portion 200C than on similarities. In FIG. 4A, jumper patterns 420(1) and 420(2) are included in layer M(i+1) and are disposed so as to overlap corresponding first and second ends correspondingly of routed patterns 402(1), 402(2) and 402(3). Via patterns 422 are included in layer VIA(i) and are disposed at locations where jumper patterns 420(1)-420(2) overlap corresponding first and second ends correspondingly of routed patterns 402(1), 402(2) and 402(3).

More particularly, FIGS. 4B-4C are corresponding portions 400B-400C of a layout diagram showing post-dummy-fill revisions made to portion 400A (FIG. 4A) of the layout diagram, in accordance with one or more embodiments.

The post-dummy-fill revisions of FIGS. 4B-4C are made to reduce the resistance of the electrically parallel configuration of routed patterns 402(1)-402(3), and thereby reduce a signal propagation delay associated with the electrically parallel configuration of routed patterns 402(1)-402(3). More particularly, the post-dummy-fill revisions of FIGS. 4B-4C are made to reduce the resistance of the electrically parallel configuration of routed patterns 402(1)-402(3) by converting dummy pattern 404(5) into an electrically parallel configuration with existing electrically parallel configuration of routed patterns 402(1)-402(3).

Portion 400B of FIG. 4B is similar to portion 400A of FIG. 4A. For purposes of brevity, the discussion will focus on differences between portion 400B and portion 400A. In FIG. 4B, jumper patterns 420(1) and 420(2) of FIG. 4A have been extended so as to overlap corresponding first and second ends of dummy pattern 404(5), as well as routed patterns 402(1), 402(2) and 402(3), and accordingly are referred to as jumper patterns 420(1)' and 420(2)'.

Portion 400C of FIG. 4C is similar to portion 400B of FIG. 4B. For purposes of brevity, the discussion will focus on differences between portion 400C and portion 400B. In FIG. 4C, additional via patterns 424 are included in layer VIA(i) and are disposed at locations where jumper patterns 220(1)'-220(2)' overlap corresponding first and second ends of dummy pattern 404(5), as well as first and second ends correspondingly of routed patterns 402(1)-402(3).

The combination of jumper patterns 420(1)'-420(2)' and the corresponding via patterns 422 and 424 in portion 400C of FIG. 4C arranges dummy pattern 404(5) of FIG. 4C into electrically parallel configuration with the existing electrically parallel configuration of routed patterns 402(1), 402(2) and 402(3). Accordingly, dummy pattern 404(5) of FIG. 4B is shown in FIG. 4C as converted pattern 404(5)'.

The electrically parallel configuration of converted pattern 404(5)' and routed patterns 402(1)-402(3) exhibits a lower resistance than the existing electrically parallel configuration of routed patterns 402(1)-402(1) taken alone. As a beneficial consequence, a signal propagation delay associated with the electrically parallel configuration of converted pattern 404(5)' and routed patterns 402(1)-402(3) is smaller than the signal propagation delay associated with the existing electrically parallel configuration of routed patterns 402(1)-402(1) taken alone.

For simplicity of description, FIG. 4C assumes that dummy pattern 404(5) is available for conversion into the electrically parallel configuration with routed patterns 402(1)-402(3), and that dummy pattern 404(4) is not available for conversion into the electrically parallel configuration with routed patterns 402(1)-402(3). Accordingly, for example, no via patterns 422 or 424 are shown where ends of dummy pattern 404(4) are overlapped by corresponding jumper patterns 420(1)' and 420(2)'.

Figure 5A:
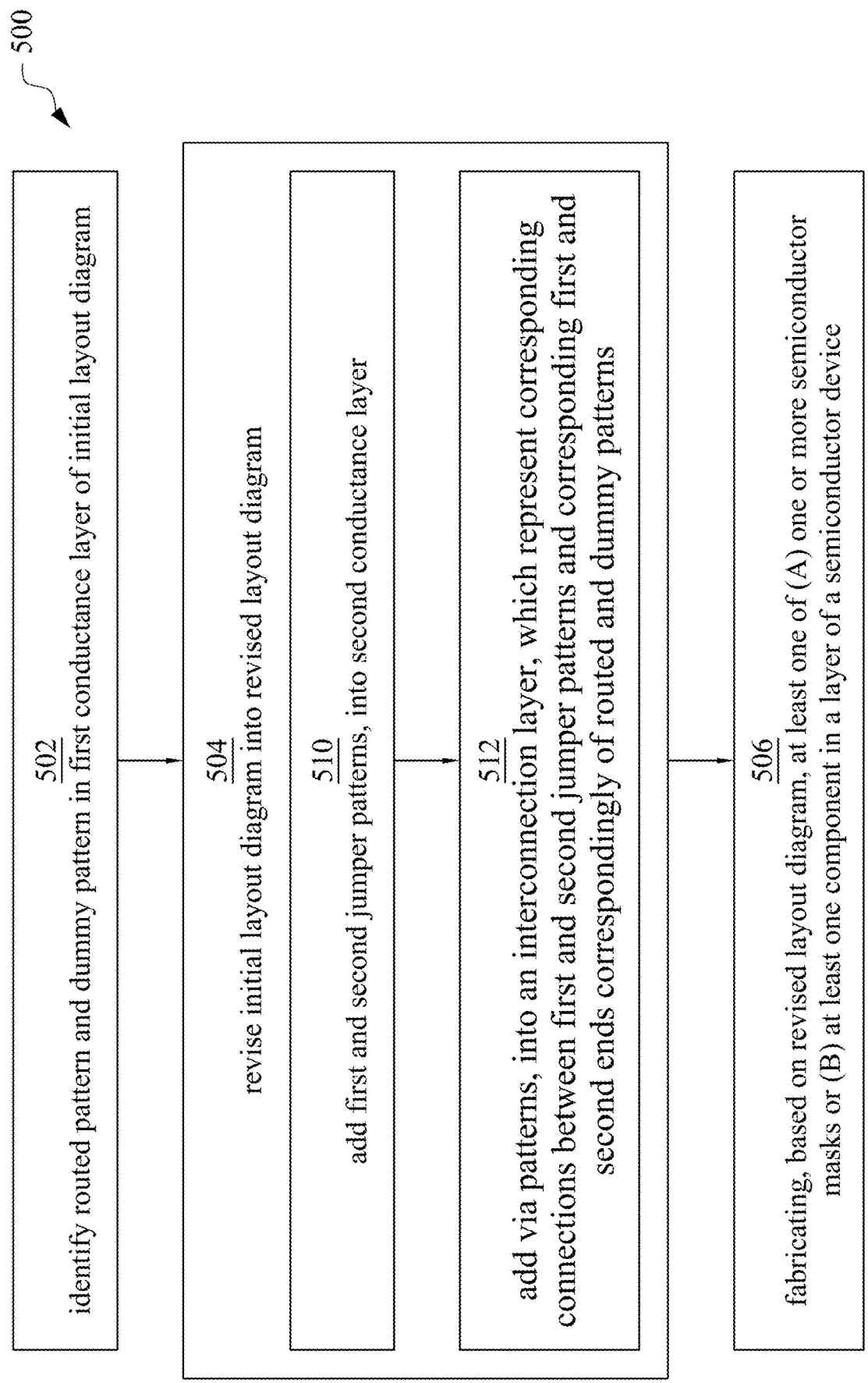
FIG. 5A is a flowchart of a method of revising a layout diagram, in accordance with one or more embodiments.

FIG. 5A is a flowchart of a method 500 of revising an initial layout diagram of a wire routing arrangement, in accordance with one or more embodiments.

Method 500 is alternately described as a method of converting one or more adjacent dummy patterns into an electrically parallel configuration with a routed pattern, which is an example of a conversion process.

Examples of a portion of an initial layout diagram which can be revised according to method 500 include portion 200A of FIG. 2A, portion 300 of FIG. 3, or the like. In some embodiments, the initial layout diagram and versions thereof are stored on a non-transitory computer-readable medium, e.g., 704 in FIG. 7 (discussed below). Method 500 is implementable, for example, using EDA system 700 (FIG. 7, discussed below), in accordance with some embodiments.

In FIG. 5A, method 500 includes blocks 502-506. At block 502, in a first conductance layer of the initial layout diagram, a routed pattern and a dummy pattern are identified in a first conductance layer. An example of the first conductance layer is layer M(i) of portion 200A of FIG. 2A. An example of the routed pattern is routed pattern 202 of portion 200A of FIG. 2A. An example of the dummy pattern is dummy pattern 204(5) of portion 200A of FIG. 2A. Each of the routed pattern and the dummy pattern extends in a first direction. An example of the first direction is the X-axis and is described as being horizontal. Where the layout diagram is a representation of a circuit, the routed and dummy patterns are correspondingly functional and non-functional. From block 502, flow proceeds to block 504.

At block 504, the initial layout diagram is revised into a revised layout diagram. Block 504 includes blocks 510-512. At block 510, first and second jumper patterns, are added into a second conductance layer. An example of the second conductance layer is layer M(i+1) of portion 200B of FIG. 2B. The first and second jumper patterns extend in a second direction which is substantially perpendicular to the first direction. Where the first direction is assumed to be the X-axis, a corresponding example of the second direction is the Y-axis and is described as being vertical. Examples of the first and second jumper patterns include jumper patterns 220(1) and 220(2) of portion 200B of FIG. 2B. From block 510, flow proceeds to block 512.

At block 512, via patterns are added to an interconnection layer between the first and second conductance layers. The via patterns represent corresponding connections between the first and second jumper patterns and corresponding first and second ends correspondingly of the routed and dummy patterns. Examples of the via patterns include via patterns 222 of FIG. 2C. From block 512, flow exits block 504 and proceeds to block 506.

At block 506, based on the revised layout diagram, at least one of (A) one or more semiconductor masks or (B) at least one component in a layer of a semiconductor device is fabricated. See discussion below of FIG. 8. In some embodiments, the fabricating further includes performing one or more lithographic exposures based on the revised layout diagram.

Figure 5B:
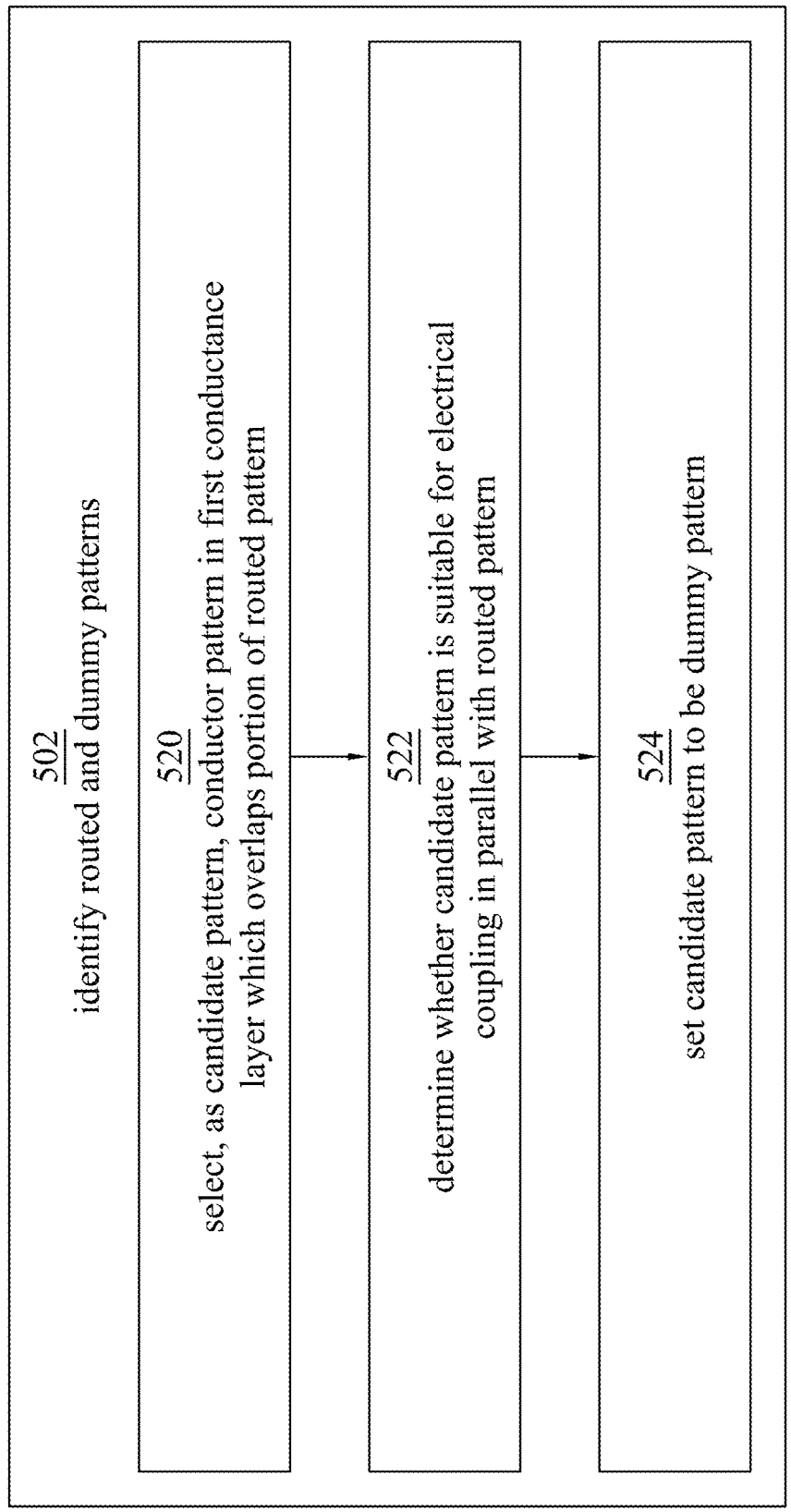
FIG. 5B is a flowchart of details of a block of the flowchart of FIG. 5A, in accordance with some embodiments.

FIG. 5B is a flowchart of showing more detail regarding block 502 of method 500, in accordance with some embodiments.

In FIG. 5B, block 502 (which, again, identifies routed and dummy patterns) is shown as including blocks 520-524. At block 520, as a candidate pattern, a conductor pattern in the first conductance layer is selected which overlaps, relative to the second direction (e.g., vertical direction), a portion of the routed pattern. Examples of dummy patterns which could be selected as a candidate pattern include dummy patterns 204(1), 204(2), 204(3), 204(5), 204(6), 204(7) and 204(8) of FIG. 2A. From block 520, flow proceeds to block 522.

At block 522, it is determined whether the candidate pattern is suitable for electrical coupling in parallel with the routed pattern. Such determination is discussed in more detail with respect to FIGS. 5C-5D (discussed below). From block 522, flow proceeds to block 524. At block 524, assuming that the candidate pattern is suitable, the candidate pattern is set to be the dummy pattern.

Figure 5C:
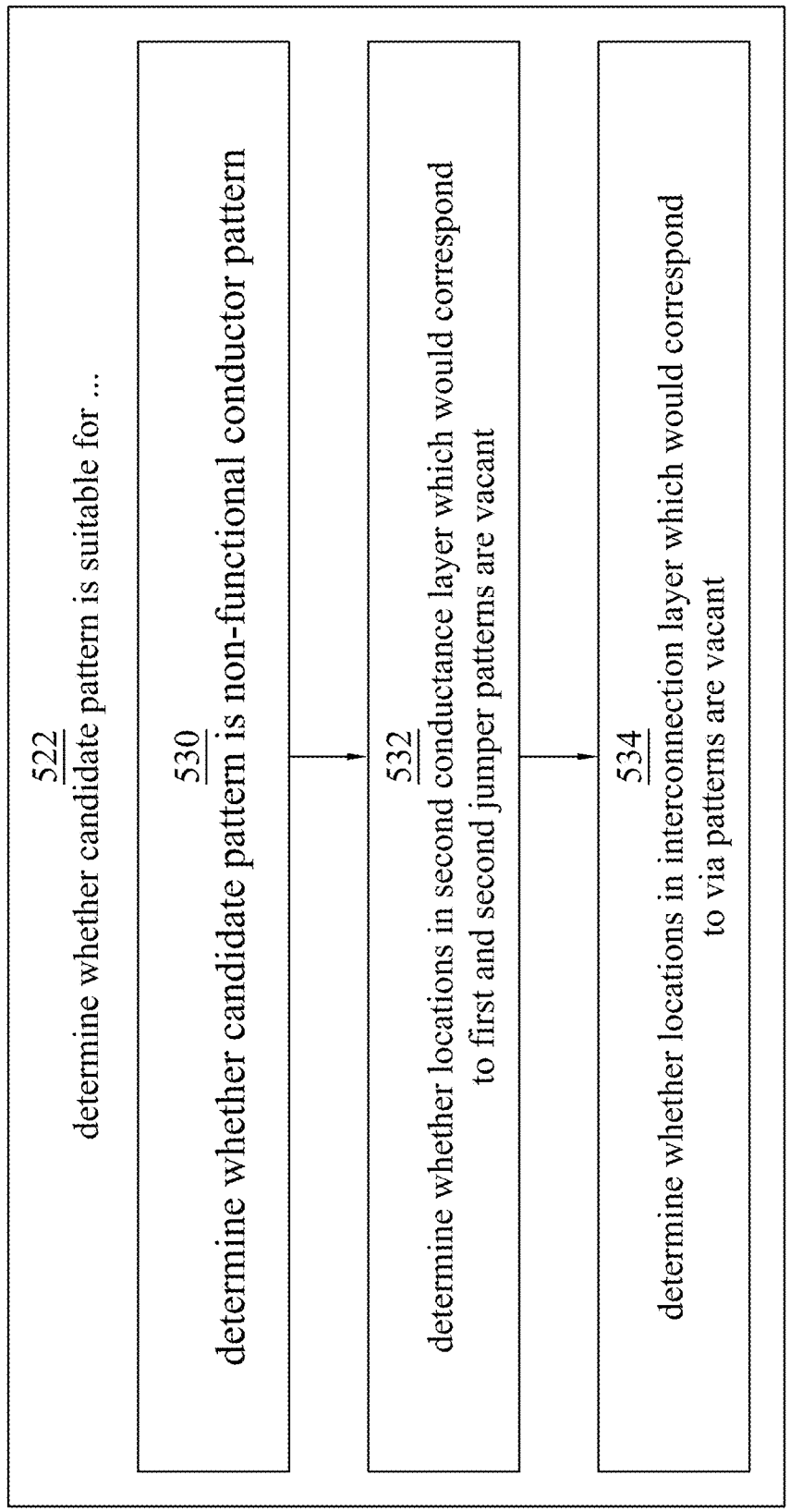
FIG. 5C is a flowchart of details of a block of the flowchart of FIG. 5B, in accordance with some embodiments.

FIG. 5C is a flowchart of showing more detail regarding block 522 of FIG. 5B, in accordance with some embodiments.

In FIG. 5C, block 522 (which, again, determines whether the candidate pattern is suitable for electrical coupling in parallel with the routed pattern) is shown as including blocks 530-534. At block 530, it is determined whether the candidate pattern is a non-functional pattern. In the example context of portion 200A of FIG. 2A in which the routed pattern corresponds to routed pattern 202, the candidate patterns correspond to dummy patterns 204(1)-204(8), each of which is non-functional. In another example context, namely of portion 300 of FIG. 3, if the routed pattern corresponds to routed pattern 302(2), then the other patterns include routed patterns 302(1) and 302(3), and dummy patterns 304(1)-304(6). As such, not all of the other patterns are non-functional. Dummy patterns 304(1)-304(6) are non-functional, but routed patterns 302(1) and 302(3) are functional. Assuming that the candidate pattern is non-functional, from block 530, flow proceeds to block 532.

At block 532, it is determined whether locations in the second conductance layer which would correspond to the first and second jumper patterns are vacant. One or more of the locations might not be vacant, e.g., because of having already been allocated for another functional wiring purpose. Assuming that the locations in the second conductance layer are available, from block 532, flow proceeds to block 534. At block 534, it is determined whether locations in the interconnection layer which would correspond to the via patterns are vacant. One or more of the locations might not be vacant, e.g., because of having already been allocated for another functional wiring purpose.

Figure 5D:
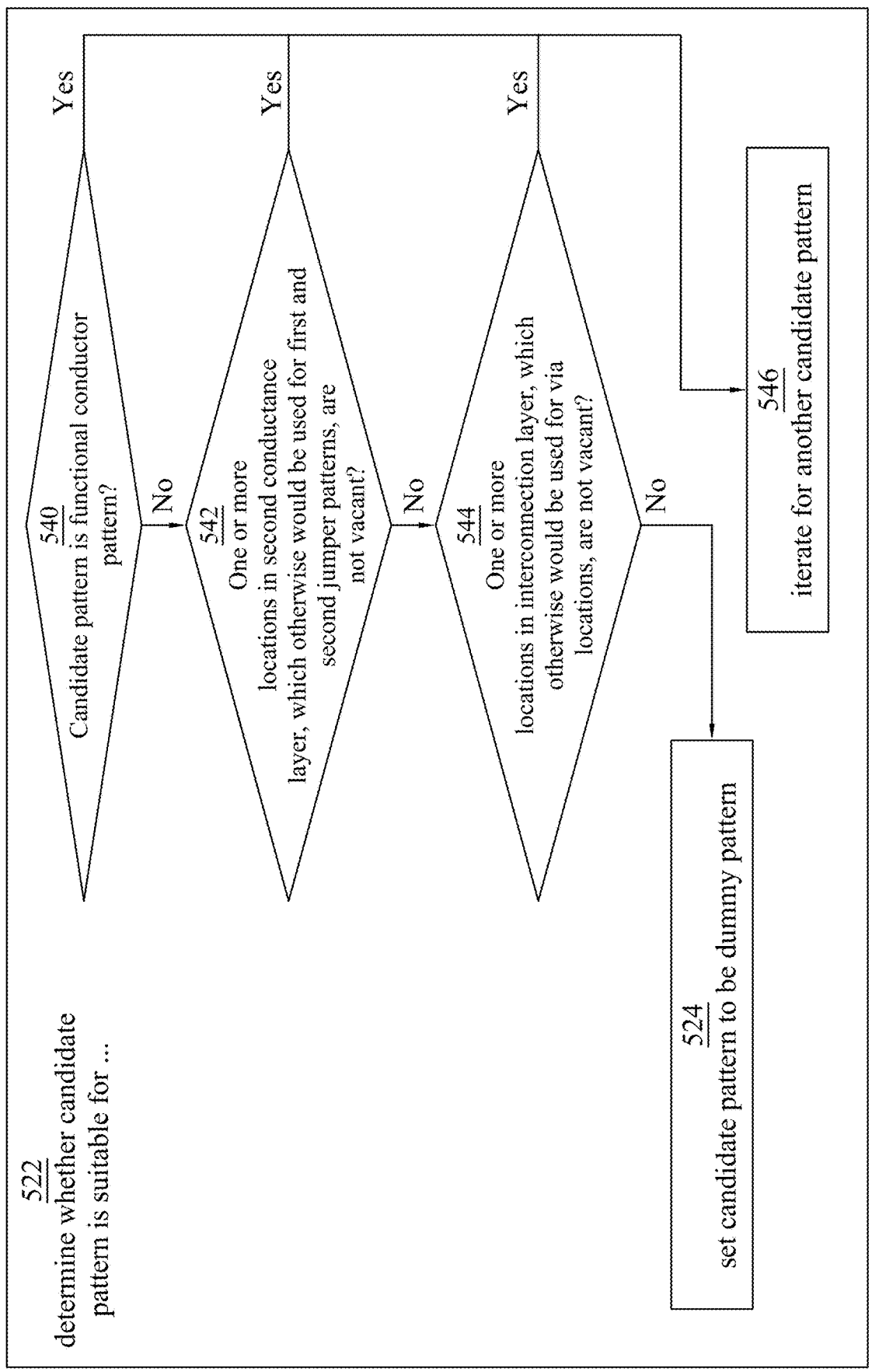
FIG. 5D is a flowchart of details of a block of the flowchart of FIG. 5B, in accordance with some embodiments.

FIG. 5D is a flowchart of showing more detail regarding block 522 of FIG. 5B, in accordance with some embodiments.

FIG. 5D is similar to FIG. 5C, but is more detailed than FIG. 5C.

In FIG. 5C, block 522 (which, again, determines whether the candidate pattern is suitable for electrical coupling in parallel with the routed pattern) is shown as including blocks 540-546. At block 540, a decision is made whether the candidate pattern is a functional pattern. If the outcome of block 540 is yes (meaning the candidate pattern is functional), then flow proceeds to block 546 (discussed below). If the outcome of block 540 is no (meaning the candidate pattern is not functional), then flow proceeds to block 542.

At block 542, it is determined whether one or more locations in the second conductance layer which would correspond to the first and second jumper patterns are not vacant. If the outcome of block 542 is yes (meaning one or more locations are not vacant), then flow proceeds to block 546 (discussed below). If the outcome of block 542 is no (meaning none of the locations is not vacant, i.e., all of the locations are vacant), then flow proceeds to block 544.

At block 544, it is determined whether one or more locations in the interconnection layer which would correspond to the via patterns are not vacant.

If the outcome of block 544 is yes (meaning one or more locations are not vacant), then flow proceeds to block 546 (discussed below). If the outcome of block 544 is no (meaning none of the locations is not vacant, i.e., all of the locations are vacant), then flow proceeds to block 524. At block 524, the candidate pattern is set to be the dummy pattern.

As noted, depending upon the outcomes of the decisions of the corresponding decisions, flow proceeds from each of blocks 540-542 to block 546. At block 546, at least block 540, and potentially blocks 542-544, is/are iterated for another candidate pattern.

Figure 6:
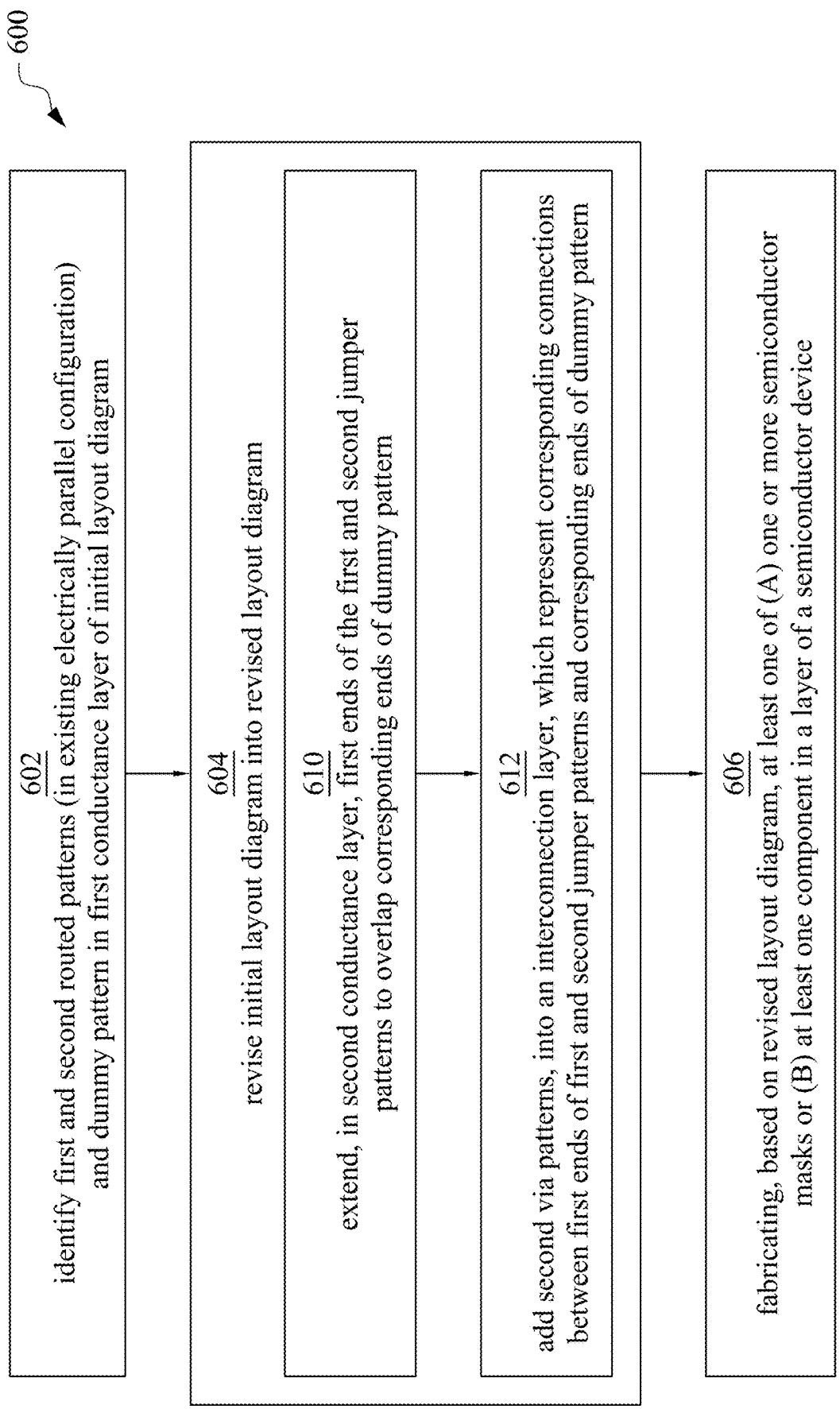
FIG. 6 is a flowchart of a method of revising a layout diagram, in accordance with one or more embodiments.

FIG. 6 is a flowchart of a method 600 of revising an initial layout diagram of a wire routing arrangement, in accordance with one or more embodiments.

Method 600 is alternately described as a method of converting one or more adjacent dummy patterns into an electrically parallel configuration with an existing electrically parallel configuration of routed patterns), which is an example of a conversion process.

Examples of a portion of an initial layout diagram which can be revised according to method 600 include portion 300 of FIG. 3, or the like. In some embodiments, the initial layout diagram and versions thereof are stored on a non-transitory computer-readable medium, e.g., 704 in FIG. 7 (discussed below). Method 600 is implementable, for example, using EDA system 700 (FIG. 7, discussed below), in accordance with some embodiments.

In FIG. 6, method 600 includes blocks 602-606. At block 602, in a first conductance layer of the initial layout diagram, at least first and second routed patterns and a dummy pattern are identified in a first conductance layer, the at least first and second routed patterns being in an existing electrically parallel configuration. An example of the first conductance layer is layer M(i) of portion 400A of FIG. 4A, which corresponds to layer M(i) of portion 200A of FIG. 2A. Examples of the at least first and second routed pattern are routed patterns 402(1), 402(2) and 402(3) of portion 400A of FIG. 4A. An example of the dummy pattern is dummy pattern 404(5) of portion 400A of FIG. 4A. Each of the at least first and second routed patterns and the dummy pattern extends in a first direction. An example of the first direction is the X-axis and is described as being horizontal. Where the layout diagram is a representation of a circuit, the at least first and second routed patterns and the dummy pattern are correspondingly functional and non-functional. From block 602, flow proceeds to block 604.

At block 604, the initial layout diagram is revised into a revised layout diagram. Block 604 includes blocks 610-612. At block 610, first and second jumper patterns in a second conductance layer are extended so as to overlap corresponding first and second ends of a convertible dummy pattern. An example of the second conductance layer is layer M(i+1) of portion 400A of FIG. 4A, which corresponds to layer M(i+1) of portion 200B of FIG. 2B. The first and second jumper patterns extend in a second direction which is substantially perpendicular to the first direction. Where the first direction is assumed to be the X-axis, a corresponding example of the second direction is the Y-axis and is described as being vertical. Examples of the first and second jumper patterns include jumper patterns 420(1) and 420(2) of portion 400A of FIG. 4A. Examples of the first and second extended jumper patterns include jumper patterns 420(1)' and 420(2)' of portion 400B of FIG. 4B. An example of a convertible dummy pattern is dummy pattern 404(5) of FIG. 4B. From block 610, flow proceeds to block 612.

At block 612, via patterns are added to an interconnection layer between the first and second conductance layers. The via patterns represent corresponding connections between the first and second jumper patterns and corresponding first and second ends correspondingly of the at least first and second routed patterns and the dummy pattern. Examples of the via patterns include via patterns 424 of FIG. 4C. From block 612, flow exits block 604 and proceeds to block 606.

At block 606, based on the revised layout diagram, at least one of (A) one or more semiconductor masks or (B) at least one component in a layer of a semiconductor device is fabricated. See discussion below of FIG. 8. In some embodiments, the fabricating further includes performing one or more lithographic exposures based on the revised layout diagram.

In some embodiments, the conversion process is iterative in a nested loop manner which includes first, second and third loops. The first loop iterates in terms of increasing a level of parallelization (see discussion below), where the level of parallelization represents a number of dummy patterns which are configured electrically parallel with a given routed pattern. The second loop, which is interior/inner to the first loop, iterates in terms of which routed pattern is currently having its parallelization increased (see discussion below). The third loop, which is interior/inner to the second loop, iterates in terms of which dummy pattern is currently being converted into a parallel configuration with the routed pattern.

In some embodiments, each pass through the first loop (which has index i, where i is a non-negative integer) increases the currently targeted level of parallelization ($i^{th}$ level) by incrementally adding a dummy pattern to the number of dummy patterns which are converted into an electrically parallel configuration with the given routed pattern. Before the first pass through the first loop, it is assumed that no dummy patterns are in an electrically parallel configuration with corresponding routed patterns, such that the first pass through the first loop (i=0) adds one dummy pattern (where available) correspondingly to a given routed pattern. In some embodiments, flow exits the first loop when one or more stopping criteria are satisfied or when no further parallelization can be achieved because no dummy pattern remains available for conversion.

In some embodiments, each pass through the second loop (which has index j, where j is a non-negative integer) iteratively improves a resistance of the currently targeted routed pattern ($j^{th}$ routed pattern) (or the currently targeted existing electrically parallel configuration of routed patterns) by placing the $j^{th}$ routed pattern into an electrically parallel configuration with a dummy routed pattern. Flow exits the second loop when no routed pattern remains unassessed, i.e., when all patterns have been assessed. Upon exiting the second loop, the first loop increments to the $(i+1)^{th}$ level of parallelization. In some embodiments, as described above regarding FIGS. 5A-5D, the conversion process is applied to a given routed pattern.

In some embodiments, each pass through the third loop (which has index k, where k is a non-negative integer) iteratively considers a $k^{th}$ dummy pattern for conversion. Flow exits the third loop when a dummy pattern is identified and converted, or when no dummy pattern remains available for conversion. Upon exiting the third loop, the second loop increments to the $(j+1)^{th}$ routed pattern.

In some embodiments, iteration of the second loop progresses according to a prioritization of the routed patterns. In some embodiments, the prioritization is from highest to lowest priority, e.g., where the $j^{th}$ routed pattern for j=0 represents the highest priority pattern, the $j^{th}$ routed pattern for j=1 represents the next highest priority pattern, and so forth. In some embodiments, the prioritization is based on aspects of the one or more circuits to which a given routed pattern is electrically connected.

In some embodiments, regarding the second loop, it is recognized whether a given routed pattern is a member of an existing electrically parallel configuration of routed patterns. More particularly, if the $j^{th}$ routed pattern is a member of an existing electrically parallel configuration of routed patterns for which another member has already been targeted during the $1^{th}$ iteration of the first loop, then the second loop increments from the $j^{th}$ routed pattern to the $(j+1)^{th}$ routed pattern.

In some embodiments, the second loop increments from the $j^{th}$ routed pattern to the $(j+1)^{th}$ routed pattern when a level of parallelization for the $j^{th}$ routed pattern is reached which matches a number of routing patterns which were in an electrically parallel configuration with the $j^{th}$ routed pattern when the conversion process began. For example, if the $j^{th}$ routed pattern was in an electrically parallel configuration with one another given routed pattern when the conversion process began, then flow exits the second loop when it is determined that there are two levels of parallelization are achieve with respect to the $j^{th}$ routed pattern, i.e., when two dummy patterns have been converted into an electrically parallel configuration with the $j^{th}$ routed pattern and the other given routed pattern.

In some embodiments, the third loop increments through the unconsidered dummy patterns on a priority basis. In some embodiments, the unconsidered dummy patterns are prioritized on the basis of one or more corresponding attributes correspondingly of the unconsidered dummy patterns. In some embodiments, the unconsidered dummy patterns are prioritized on the basis of distance in the layer M(i) from the $j^{th}$ routed pattern, with the $k^{th}$ dummy pattern representing the dummy pattern with the closest distance to the $j^{th}$ routed pattern, the $(k+1)^{th}$ dummy pattern representing the dummy pattern with the next closest distance to the $j^{th}$ routed pattern, and so forth. In some embodiments, where first and second dummy patterns are the same distance to the $j^{th}$ routed pattern, one or more additional factors are applied to rank the corresponding first and second dummy patterns. In some embodiments, an additional factor is the distance from the given dummy pattern to a corresponding nearest another routed pattern other than the $j^{th}$ routed pattern. In some embodiments, if a first distance from the first dummy pattern to a first nearest another routed pattern is smaller than a second distance of the second dummy pattern to a second nearest another routed pattern, then the first dummy pattern is ranked higher than the second dummy pattern such that the first dummy pattern becomes the $k^{th}$ dummy pattern and the second dummy pattern becomes the $(k+1)^{th}$ dummy pattern.

Figure 7:
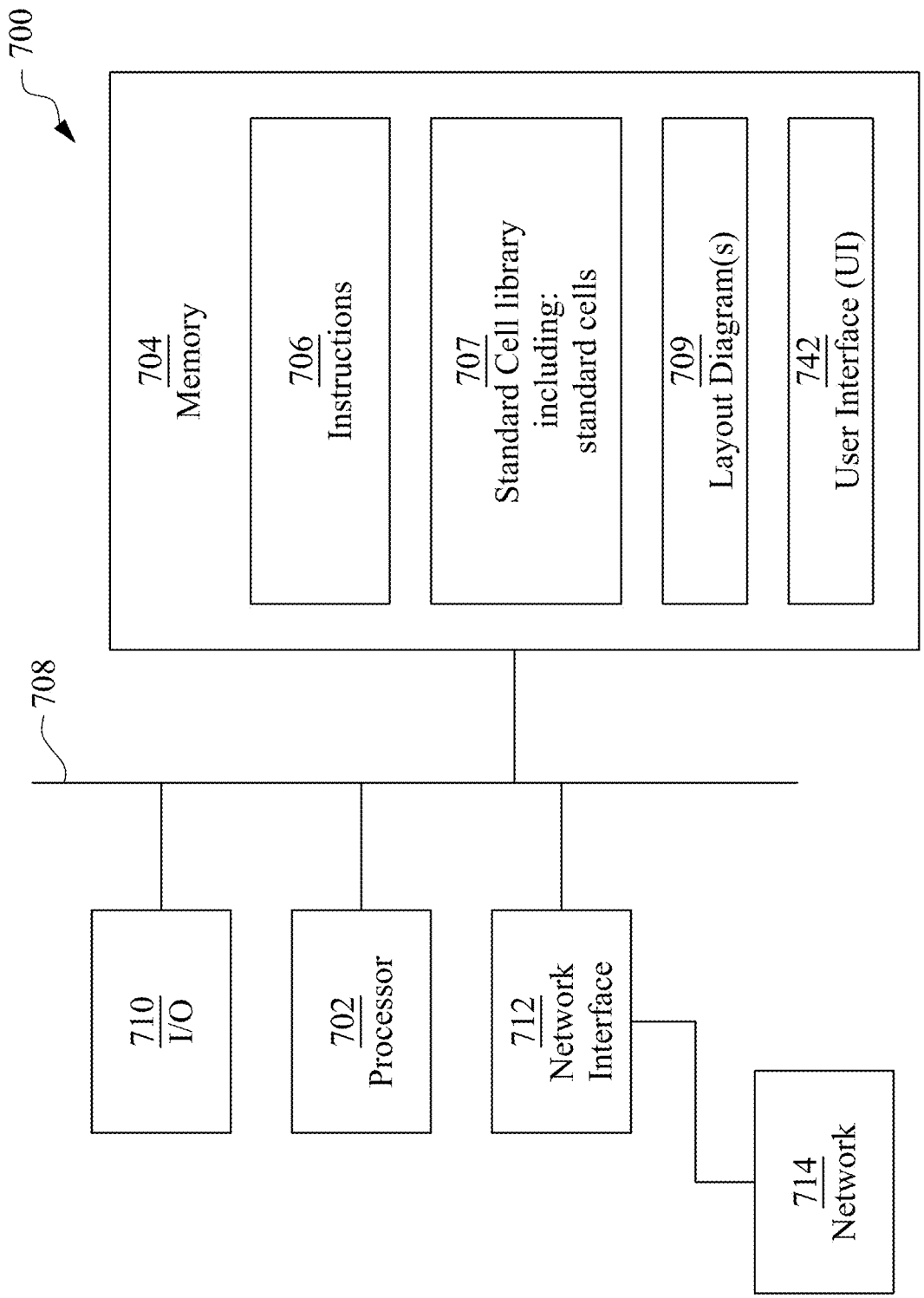
FIG. 7 is a block diagram of an electronic design automation (EDA) system in accordance with some embodiments.

FIG. 7 is a block diagram of an electronic design automation (EDA) system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of, e.g., the methods described herein in accordance with one or more (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein. In one or more embodiments, storage medium 704 stores one or more layout diagrams 709.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
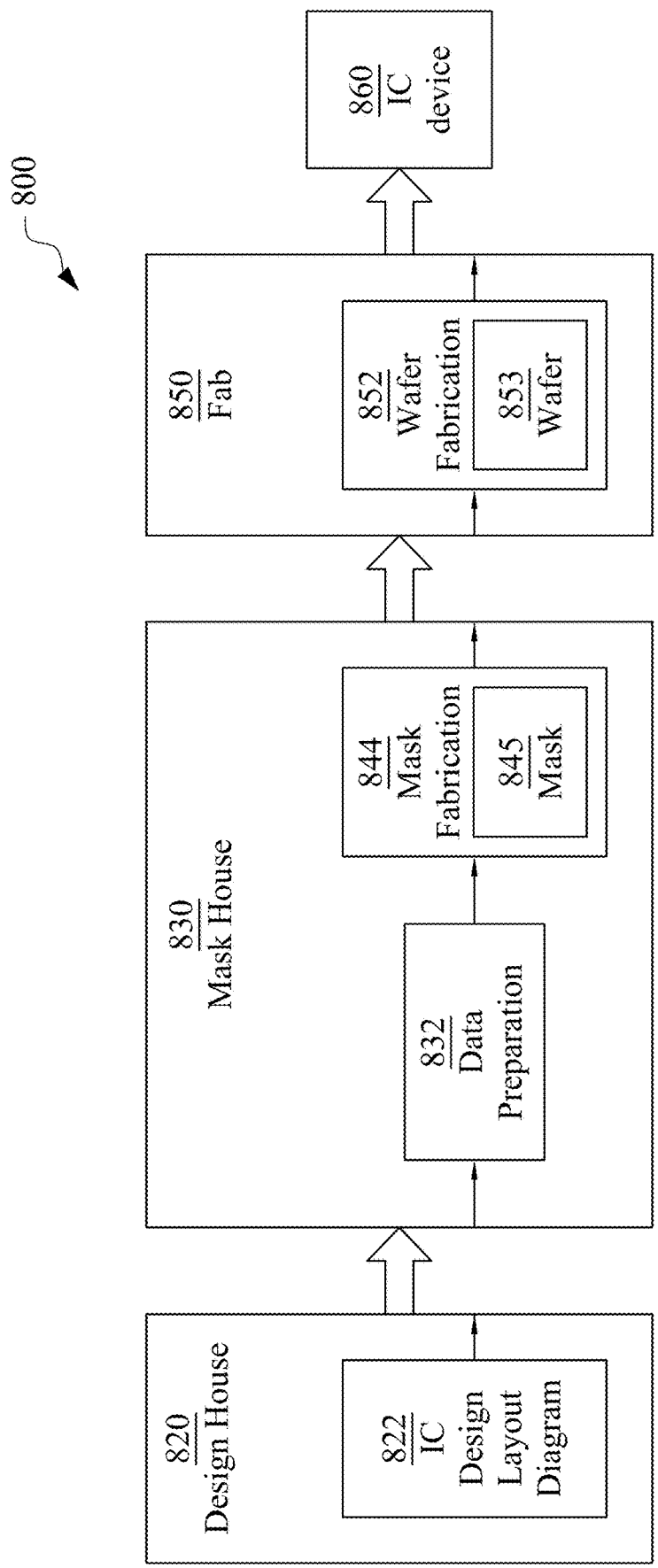
FIG. 8 is a block diagram of an integrated circuit (IC) manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments.

In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and published Feb. 6, 2014, and U.S. Pat. No. 7,260,442, granted Aug. 21, 2007, the entireties of each of which are hereby incorporated by reference. It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In an embodiment, a method (of revising an initial layout diagram of a wire routing arrangement, the initial layout diagram and versions thereof being stored on a non-transitory computer-readable medium) includes: identifying, in a first conductance layer of the initial layout diagram, a routed pattern and a dummy pattern, each of which extends in a first direction; the routed patterns being functional in a representation of a circuit; the dummy patterns being non-functional in the representation of the circuit; and revising to form a revised layout diagram, the revising including adding first and second jumper patterns, into a second conductance layer, which extend in a second direction substantially perpendicular to the first direction, and adding via patterns, into an interconnection layer between the first and second conductance layers, which represent (A) connections between the first jumper pattern and first ends of the corresponding routed and dummy patterns, and (B) connections between the second jumper pattern and second ends of the corresponding routed and dummy patterns. In an embodiment, the identifying includes: selecting, as a candidate pattern, a conductor pattern in the first conductance layer which overlaps, relative to the second direction, a portion of the routed pattern; and setting, if the candidate pattern is suitable for electrical coupling in parallel with the routed pattern, the candidate pattern to be the dummy pattern. In an embodiment, the determining includes: determining that the candidate pattern is a non-functional conductor pattern; determining that locations in the second conductance layer, which correspond to the first and second jumper patterns, are vacant; and determining that locations in the interconnection layer, which correspond to the via patterns, are vacant. In an embodiment, the candidate pattern is a nearest, relative to the second direction, one of non-functional conductor patterns in the first conductance layer. In an embodiment, the determining includes: determining that the candidate pattern is a functional conductor pattern; and repeating the selecting and determining for another candidate pattern. In an embodiment, the determining includes: determining that one or more locations in the second conductance layer, which otherwise are to be used for the corresponding first and second jumper patterns, are not vacant; and repeating the selecting and determining for another candidate pattern. In an embodiment, the determining includes: determining that one or more locations in the interconnection layer, which otherwise are to be used for one or more of the via patterns, are not vacant; and repeating the selecting and determining for another candidate pattern. In an embodiment, each conductance layer represents a metallization layer; and each conductor pattern represents a metal conductor. In an embodiment, the functional conductor pattern represents a via pillar. In an embodiment, the method further includes: fabricating, based on the revised layout diagram, at least one of (A) one or more semiconductor masks or (B) at least one component in a layer of a semiconductor integrated circuit.

In an embodiment, a system (for revising an initial layout diagram of a wire routing arrangement, the initial layout diagram and versions thereof being stored on a non-transitory computer-readable medium) includes at least one processor, and at least one memory including computer program code for one or more programs, and wherein the at least one memory, the computer program code and the at least one processor are configured to cause the system to execute at least as follows: identifying, as a routed pattern, a conductor pattern in a first conductance layer of the initial layout diagram which extends in a first direction and which is functional in a representation of a circuit; selecting, as a candidate pattern, a conductor pattern in the first conductance layer that overlaps, relative to a second direction which is substantially perpendicular to the first direction, a portion of the routed pattern, the candidate pattern being non-functional in the representation of the circuit; setting, if the candidate pattern is suitable for electrical coupling in parallel with the routed pattern, the candidate pattern to be a dummy pattern; and revising the initial layout diagram into a revised layout diagram, the revising including: adding first and second jumper patterns, into a second conductance layer, which extend in a second direction substantially perpendicular to the first direction; and adding via patterns, into an interconnection layer between the first and second conductance layers, which represent (A) connections between the first jumper pattern and first ends of the corresponding routed and dummy patterns, and (B) connections between the second jumper pattern and second ends of the corresponding routed and dummy patterns. In an embodiment, the system further includes at least one of: a masking facility configured to fabricate one or more semiconductor masks based on based on the revised layout diagram; or a fabricating facility configured to fabricate at least one component in a layer of a semiconductor integrated circuit based on the revised layout diagram. In an embodiment, the masking facility is further configured, as an aspect included in fabrication of the one or more semiconductor masks, to perform one or more lithographic exposures based on the revised layout diagram; or the fabricating facility is further configured, as an aspect included in fabrication of the at least one component in a layer of the semiconductor integrated circuit, to perform one or more lithographic exposures based on the revised layout diagram. In an embodiment, the determining includes: determining that the candidate pattern is a non-functional conductor pattern; determining that locations in the second conductance layer which correspond to the first and second jumper patterns are vacant; and determining that locations in the interconnection layer which correspond to the via patterns are vacant. In an embodiment, the determining includes one or more as follows: (A) including determining that the candidate pattern is a functional conductor pattern, and repeating the selecting and determining for another candidate pattern; or (B) including determining that one or more locations in the second conductance layer, which otherwise are to be used for the corresponding first and second jumper patterns, are not vacant, and repeating the selecting and determining for another candidate pattern; or (C) including determining that one or more locations in the interconnection layer, which otherwise are to be used for one or more of the via patterns, are not vacant, and repeating the selecting and determining for another candidate pattern.

In an embodiment, a method (of revising an initial layout diagram of a wire routing arrangement, the initial layout diagram and versions thereof being stored on a non-transitory computer-readable medium) includes: identifying, in a first conductance layer of the initial layout diagram, first and second routed patterns and a dummy pattern, each of which extends in a first direction; each of the first and second routed pattern being functional, and the dummy pattern being non-functional, in a representation of a circuit; the initial layout diagram further including: first and second jumper patterns, in a second conductance layer, which extend in a second direction substantially perpendicular to the first direction; and first via patterns, in an interconnection layer between the first and second conductance layers, which represent corresponding connections between the first and second jumper patterns and corresponding first and second ends correspondingly of the first and second routed patterns; revising the initial layout diagram into a revised layout diagram, the revising including: extending first ends of the first and second jumper patterns in the second direction so as to overlap corresponding first and second ends of the dummy pattern; and adding second via patterns, into the interconnection layer, which represent corresponding connections between the first ends of the first and second jumper patterns and corresponding ends of the dummy pattern. In an embodiment, the identifying includes: selecting, as a candidate pattern, a conductor pattern in the first conductance layer which overlaps, relative to the second direction, a portion of each of the first and second routed patterns; and setting, if the candidate pattern is suitable for electrical coupling in parallel with the routed pattern, the candidate pattern to be the dummy pattern. In an embodiment, the determining includes: determining that the candidate pattern is a non-functional conductor pattern; determining that locations in the second conductance layer, into which the first and second jumper patterns are to be correspondingly extended, are vacant; and determining that locations in the interconnection layer, which are to correspond to the second via patterns, are vacant. In an embodiment, the determining includes one or more as follows: (A) including determining that the candidate pattern is a functional conductor pattern, and repeating the selecting and determining for another candidate pattern; or (B) including determining that one or more locations in the second conductance layer, which otherwise are to be used for correspondingly extending the first and second jumper patterns, are not vacant, and repeating the selecting and determining for another candidate pattern; or (C) including determining that one or more locations in the interconnection layer, which otherwise are to be used for one or more of the second via patterns, are not vacant, and repeating the selecting and determining for another candidate pattern. In an embodiment, the method further includes: fabricating, based on the revised layout diagram, at least one of (A) one or more semiconductor masks or (B) at least one component in a layer of a semiconductor integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of revising an initial layout diagram of a wire routing arrangement, the initial layout diagram and versions thereof being stored on a non-transitory computer-readable medium, the method comprising:
   identifying, in a first conductance layer of the initial layout diagram, a routed pattern and a dummy pattern, each of which extends in a first direction;
   the routed patterns being functional in a representation of a circuit;
   the dummy patterns being non-functional in the representation of the circuit; and
   revising to form a revised layout diagram, the revising including:
   adding first and second jumper patterns, into a second conductance layer, which extend in a second direction substantially perpendicular to the first direction; and
   adding via patterns, into an interconnection layer between the first and second conductance layers, which represent:
   connections between the first jumper pattern and first ends of the corresponding routed and dummy patterns; and
   connections between the second jumper pattern and second ends of the corresponding routed and dummy patterns.

2. The method of claim 1, wherein the identifying includes:
   selecting, as a candidate pattern, a conductor pattern in the first conductance layer which overlaps, relative to the second direction, a portion of the routed pattern; and
   setting, if the candidate pattern is suitable for electrical coupling in parallel with the routed pattern, the candidate pattern to be the dummy pattern.

3. The method of claim 2, wherein the determining includes:
   determining that the candidate pattern is a non-functional conductor pattern;
   determining that locations in the second conductance layer, which correspond to the first and second jumper patterns, are vacant; and
   determining that locations in the interconnection layer, which correspond to the via patterns, are vacant.

4. The method of claim 2, wherein:
   the candidate pattern is a nearest, relative to the second direction, one of non-functional conductor patterns in the first conductance layer.

5. The method of claim 2, wherein the determining includes:
   determining that the candidate pattern is a functional conductor pattern; and
   repeating the selecting and determining for another candidate pattern.

6. The method of claim 2, wherein the determining includes:
   determining that one or more locations in the second conductance layer, which otherwise are to be used for the corresponding first and second jumper patterns, are not vacant; and
   repeating the selecting and determining for another candidate pattern.

7. The method of claim 2, wherein the determining includes:
   determining that one or more locations in the interconnection layer, which otherwise are to be used for one or more of the via patterns, are not vacant; and repeating the selecting and determining for another candidate pattern.

8. The method of claim 1, wherein:
each conductance layer represents a metallization layer; and
each conductor pattern represents a metal conductor.

9. The method of claim 1, wherein:
the functional conductor pattern represents a via pillar.

10. The method of claim 1, further comprising:
fabricating, based on the revised layout diagram, at least one of (A) one or more semiconductor masks or (B) at least one component in a layer of a semiconductor integrated circuit.

11. A system for revising an initial layout diagram of a wire routing arrangement, the initial layout diagram and versions thereof being stored on a non-transitory computer-readable medium, the system comprising:
at least one processor; and
at least one memory including computer program code for one or more programs; and
wherein the at least one memory, the computer program code and the at least one processor are configured to cause the system to execute at least as follows:
identifying, as a routed pattern, a conductor pattern in a first conductance layer of the initial layout diagram which extends in a first direction and which is functional in a representation of a circuit;
selecting, as a candidate pattern, a conductor pattern in the first conductance layer that overlaps, relative to a second direction which is substantially perpendicular to the first direction, a portion of the routed pattern, the candidate pattern being non-functional in the representation of the circuit;
setting, if the candidate pattern is suitable for electrical coupling in parallel with the routed pattern, the candidate pattern to be a dummy pattern; and
revising the initial layout diagram into a revised layout diagram, the revising including:
adding first and second jumper patterns, into a second conductance layer, which extend in a second direction substantially perpendicular to the first direction; and
adding via patterns, into an interconnection layer between the first and second conductance layers, which represent:
connections between the first jumper pattern and first ends of the corresponding routed and dummy patterns; and
connections between the second jumper pattern and second ends of the corresponding routed and dummy patterns.

12. The system of claim 11, further comprising at least one of:
a masking facility configured to fabricate one or more semiconductor masks based on based on the revised layout diagram; or
a fabricating facility configured to fabricate at least one component in a layer of a semiconductor integrated circuit based on the revised layout diagram.

13. The system of claim 12, wherein:
the masking facility is further configured, as an aspect included in fabrication of the one or more semiconductor masks, to perform one or more lithographic exposures based on the revised layout diagram; or
the fabricating facility is further configured, as an aspect included in fabrication of the at least one component in a layer of the semiconductor integrated circuit, to perform one or more lithographic exposures based on the revised layout diagram.

14. The system of claim 12, wherein the determining includes:
determining that the candidate pattern is a non-functional conductor pattern;
determining that locations in the second conductance layer which correspond to the first and second jumper patterns are vacant; and
determining that locations in the interconnection layer which correspond to the via patterns are vacant.

15. The system of claim 11, wherein the determining includes one or more as follows:
(A) including:
determining that the candidate pattern is a functional conductor pattern; and
repeating the selecting and determining for another candidate pattern;
(B) including:
determining that one or more locations in the second conductance layer, which otherwise are to be used for the corresponding first and second jumper patterns, are not vacant; and
repeating the selecting and determining for another candidate pattern; or
(C) including:
determining that one or more locations in the interconnection layer, which otherwise are to be used for one or more of the via patterns, are not vacant; and
repeating the selecting and determining for another candidate pattern.

16. A method of revising an initial layout diagram of a wire routing arrangement, the initial layout diagram and versions thereof being stored on a non-transitory computer-readable medium, the method comprising:
identifying, in a first conductance layer of the initial layout diagram, first and second routed patterns and a dummy pattern, each of which extends in a first direction;
each of the first and second routed pattern being functional, and the dummy pattern being non-functional, in a representation of a circuit;
the initial layout diagram further including:
first and second jumper patterns, in a second conductance layer, which extend in a second direction substantially perpendicular to the first direction; and
first via patterns, in an interconnection layer between the first and second conductance layers, which represent corresponding connections between the first and second jumper patterns and corresponding first and second ends correspondingly of the first and second routed patterns;
revising the initial layout diagram into a revised layout diagram, the revising including:
extending first ends of the first and second jumper patterns in the second direction so as to overlap corresponding first and second ends of the dummy pattern; and
adding second via patterns, into the interconnection layer, which represent corresponding connections between the first ends of the first and second jumper patterns and corresponding ends of the dummy pattern.

17. The method of claim 16, wherein the identifying includes:
   selecting, as a candidate pattern, a conductor pattern in the first conductance layer which overlaps, relative to the second direction, a portion of each of the first and second routed patterns; and
   setting, if the candidate pattern is suitable for electrical coupling in parallel with the routed pattern, the candidate pattern to be the dummy pattern.

18. The method of claim 17, wherein the determining includes:
   determining that the candidate pattern is a non-functional conductor pattern;
   determining that locations in the second conductance layer, into which the first and second jumper patterns are to be correspondingly extended, are vacant; and
   determining that locations in the interconnection layer, which are to correspond to the second via patterns, are vacant.

19. The method of claim 17, wherein the determining includes one or more as follows:
   (A) including:
      determining that the candidate pattern is a functional conductor pattern; and
      repeating the selecting and determining for another candidate pattern;
   (B) including:
      determining that one or more locations in the second conductance layer, which otherwise are to be used for correspondingly extending the first and second jumper patterns, are not vacant; and
      repeating the selecting and determining for another candidate pattern; or
   (C) including:
      determining that one or more locations in the interconnection layer, which otherwise are to be used for one or more of the second via patterns, are not vacant; and
      repeating the selecting and determining for another candidate pattern.

20. The method of claim 16, further comprising:
fabricating, based on the revised layout diagram, at least one of (A) one or more semiconductor masks or (B) at least one component in a layer of a semiconductor integrated circuit.

* * * * *